United States Patent
Lee et al.

(10) Patent No.: US 10,853,408 B2
(45) Date of Patent: Dec. 1, 2020

(54) METHOD FOR PROVIDING GRAPHIC EFFECT CORRESPONDING TO CONFIGURATION INFORMATION OF OBJECT AND ELECTRONIC DEVICE THEREOF

(71) Applicant: Samsung Electronics Co., Ltd., Suwon-si (KR)

(72) Inventors: Ho Young Lee, Seoul (KR); Nari Choi, Seoul (KR); Daehong Ki, Suwon-si (KR); June-Seok Kim, Seoul (KR); Seock Hyun Yu, Seoul (KR); Junho Choi, Seoul (KR); Hoik Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 15/925,585

(22) Filed: Mar. 19, 2018

(65) Prior Publication Data
US 2018/0267993 A1   Sep. 20, 2018

(30) Foreign Application Priority Data

Mar. 17, 2017 (KR) .................. 10-2017-0034018

(51) Int. Cl.
*G06F 16/583* (2019.01)
*G06F 3/0481* (2013.01)
(Continued)

(52) U.S. Cl.
CPC ........ *G06F 16/583* (2019.01); *G06F 3/04812* (2013.01); *G06F 3/04842* (2013.01);
(Continued)

(58) Field of Classification Search
CPC ...... G06F 19/00; G06F 19/321; G06F 16/583; G06F 17/30247; G06F 16/434; G06F 3/04842; G06F 3/04886; G06F 16/50; G06F 3/0304; G06F 3/147; G06F 3/0346; G06F 3/04812; G06F 3/04845; G06K 9/00671;
(Continued)

(56) References Cited

U.S. PATENT DOCUMENTS

| 5,640,468 A * | 6/1997 | Hsu .................... G06K 9/00201 |
| | | 382/190 |
| 6,370,262 B1 * | 4/2002 | Kawabata ............ H04N 13/128 |
| | | 382/106 |

(Continued)

FOREIGN PATENT DOCUMENTS

| KR | 10-2016-0009900 A | 1/2016 |
| KR | 10-2017-0005373 A | 1/2017 |
| WO | 2014183099 A1 | 11/2014 |

*Primary Examiner* — Aklilu K Woldemariam

(57) ABSTRACT

The present disclosure relates to a device and method for providing a graphic effect corresponding to configuration information of an object displayed on a display of an electronic device. The electronic device includes a display, a memory, and at least one processor coupled to the memory. The at least one processor is configured to control the display to display an image, detect at least one object from the image, and control the display to display detection information corresponding to the at least one object based on configuration information of the at least one object.

16 Claims, 18 Drawing Sheets

(51) Int. Cl.
*G06K 9/46* (2006.01)
*G06K 9/00* (2006.01)
*G06F 3/0484* (2013.01)
*G06F 16/432* (2019.01)

(52) U.S. Cl.
CPC ........ *G06F 3/04845* (2013.01); *G06F 16/434* (2019.01); *G06K 9/00671* (2013.01); *G06K 9/46* (2013.01); *G06K 9/4604* (2013.01); *G06K 2209/03* (2013.01); *G06K 2209/25* (2013.01)

(58) Field of Classification Search
CPC ............. G06K 9/00718; G06K 9/6202; G06K 2209/03; G06K 9/46; G06K 9/4604; G06K 9/0063; G06K 9/00201; G06K 9/3241; G06K 9/00288; G06K 9/00476; G06K 9/00577; G06K 9/00624; G06K 9/6253; G06K 9/4642; G06K 2209/25; G06T 11/60; G06T 2207/10016; G06T 2207/20004; G06T 7/0014; G06T 7/593; G06T 2200/24; G06T 7/13; G06T 7/187; G06T 11/00; G06T 2207/10024; G06T 7/11; G06T 7/90; G16H 30/40; A61B 3/0025; A61B 3/0041; A61B 1/00009; A61B 5/065; B33Y 50/00; G02C 13/005; H04N 5/23219; H04N 13/128; H04N 1/00169; H04N 1/00236; H04N 1/32101; H04N 5/23222; H04N 21/44222; H04N 13/239; H04N 13/279; H04N 13/332; H04N 13/189; H04N 13/271; H04L 9/0861; G05B 2219/23026; G02B 2027/0138; H04H 60/33
USPC ....... 382/103, 106, 154, 190, 199, 203, 214, 382/274

See application file for complete search history.

(56) References Cited

U.S. PATENT DOCUMENTS

| | | | |
|---|---|---|---|
| 8,971,637 B1* | 3/2015 | Rivard | G06T 7/13 |
| | | | 382/199 |
| 9,355,123 B2 | 5/2016 | Wnuk et al. | |
| 9,626,768 B2* | 4/2017 | Tumanov | G06T 7/149 |
| 10,331,291 B1* | 6/2019 | Poder | G06F 40/169 |
| 2004/0004559 A1* | 1/2004 | Rast | G06F 3/002 |
| | | | 341/34 |
| 2005/0185827 A1* | 8/2005 | Kono | G06K 9/00 |
| | | | 382/124 |
| 2006/0078170 A1* | 4/2006 | Kamata | G06K 9/00 |
| | | | 382/115 |
| 2007/0124669 A1* | 5/2007 | Makela | G06F 16/9577 |
| | | | 715/201 |
| 2008/0183707 A1* | 7/2008 | Asano | G07C 9/27 |
| 2009/0147998 A1* | 6/2009 | Yamaguchi | G06T 5/003 |
| | | | 382/106 |
| 2010/0315431 A1* | 12/2010 | Smith | G06T 11/20 |
| | | | 345/619 |
| 2011/0029635 A1* | 2/2011 | Shkurko | G06F 16/54 |
| | | | 709/217 |
| 2012/0036016 A1* | 2/2012 | Hoffberg | H04N 21/42201 |
| | | | 705/14.58 |
| 2012/0038671 A1* | 2/2012 | Min | G06T 19/00 |
| | | | 345/633 |
| 2014/0340570 A1* | 11/2014 | Meyers | H04N 5/2256 |
| | | | 348/370 |
| 2015/0269760 A1* | 9/2015 | Murakami | G06T 7/74 |
| | | | 345/633 |
| 2016/0005154 A1* | 1/2016 | Meyers | G06T 7/11 |
| | | | 382/274 |

\* cited by examiner

METHOD FOR PROVIDING GRAPHIC EFFECT CORRESPONDING TO CONFIGURATION INFORMATION OF OBJECT AND ELECTRONIC DEVICE THEREOF

CROSS-REFERENCE TO RELATED APPLICATION

This application is based on and claims priority under 35 U.S.C. § 119 to Korean Patent Application No. 10-2017-0034018, filed on Mar. 17, 2017, in the Korean Intellectual Property Office, the disclosure of which is incorporated by reference herein in its entirety.

TECHNICAL FIELD

The present disclosure relates to a device and method for providing a graphic effect corresponding to configuration information of an object displayed on a display of an electronic device.

BACKGROUND

The above information is presented as background information only to assist with an understanding of the present disclosure. No determination has been made, and no assertion is made, as to whether any of the above might be applicable as prior art with regard to the present disclosure.

Various electronic devices provide various functions with the development of the information & communication technology and the semiconductor technology. For example, electronic devices can provide multimedia services such as a voice call service, a message service, a broadcasting service, a wireless internet service, a camera service, and a music service.

Electronic devices can provide a searching service using a camera to improve convenience for users. For example, electronic devices can search for and output the information about a product photographed by a camera.

SUMMARY

An electronic device can extract an object to search for from an image acquired from a camera when a search service is provided. The electronic device can search for information about a corresponding object from a predetermined database, and can output the information through a display. In this case, when a plurality of objects is included in an image, a user of the electronic device may not clearly recognize an object extracted by the electronic device. Further, the electronic device requires a method for clearly recognizing an object extracted from an image acquired through a camera in order to increase accuracy in searching for an object.

Various embodiments may provide a device and method for detecting at least one object from an image displayed on a display in an electronic device.

Various embodiments may provide a device and method for displaying detection information of an object in an image displayed on a display in an electronic device.

According to various embodiments, an electronic device includes a display, at least one processor, and a memory coupled to the at least one processor. The memory can store instructions executable by the at least one processor to control the display to display an image, detect at least one object from the image, and control the display to display detection information corresponding to the at least one object based on configuration information of the at least one object.

According to various embodiments, a method of an electronic device may include an operation of displaying an image on a display electrically connected with the electronic device, an operation of detecting at least one object from the image, and an operation of displaying detection information corresponding to the at least one object based on configuration information of the at least one object.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
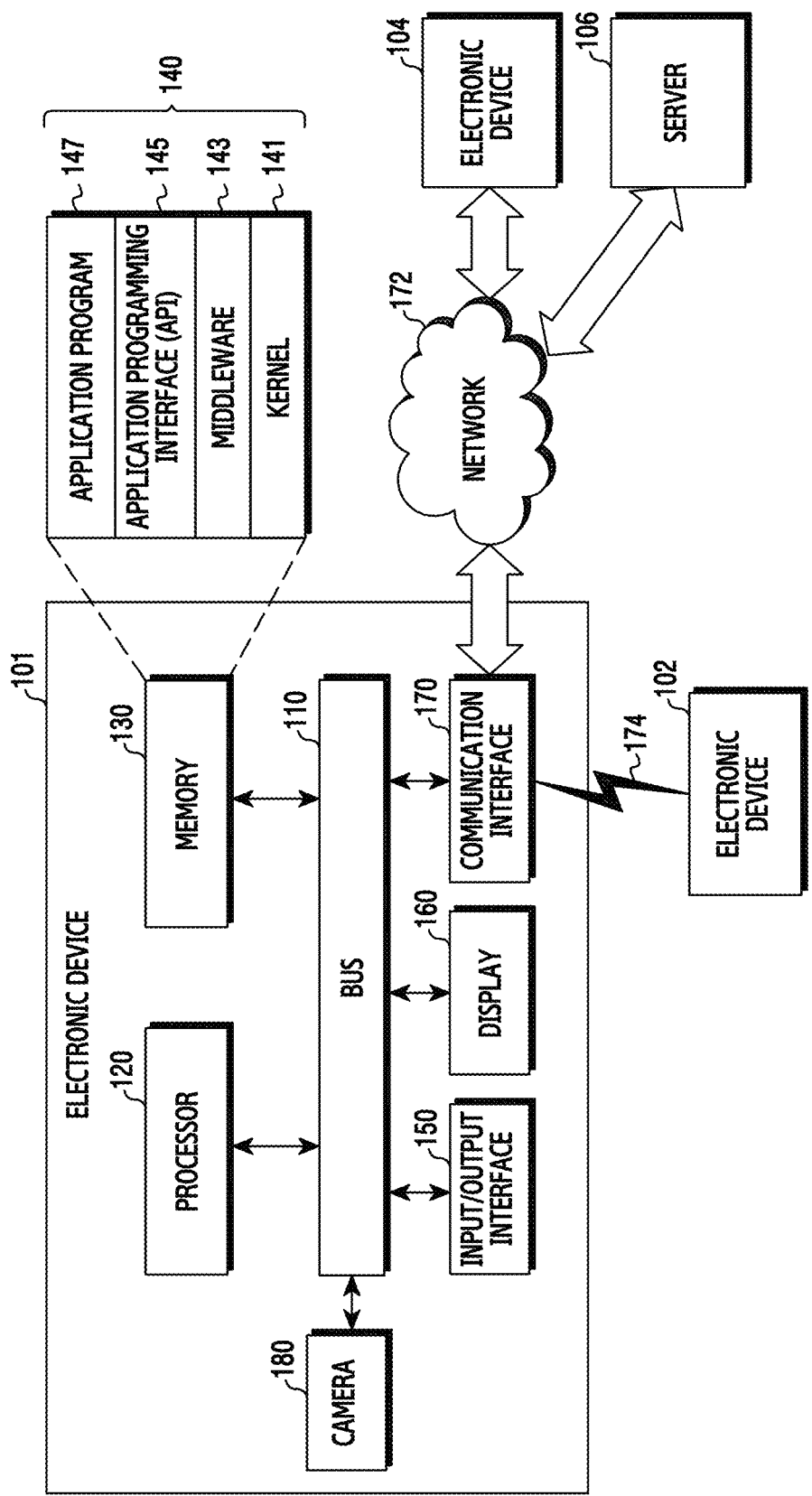
FIG. 1 illustrates an electronic device in a network environment according to various embodiments.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various exemplary embodiments of the present document are described with reference to the accompanying drawings. It should be understood, however, that it is not intended to limit the various exemplary embodiments of the present document to the particular form disclosed, but, on the contrary, it is intended to cover all modifications, equivalents, and alternatives falling within the spirit and scope of the various exemplary embodiments of the present document. Like reference numerals denote like components throughout the drawings. A singular expression includes a plural concept unless there is a contextually distinctive difference therebetween.

In the present document, an expression "A or B", "A and/or B", or the like may include all possible combinations of items enumerated together. Although expressions such as "$1^{st}$" "$2^{nd}$", "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™, an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

In the following description, detection of an object may include an operation of extracting at least one object from an image or an operation of recognizing at least one object extracted from an image.

FIG. 1 illustrates an electronic device 101 in a network environment according to various embodiments.

Referring to FIG. 1, the electronic device 101 may include a bus 110, a processor 120 (e.g., including processing circuitry), a memory 130, an I/O interface 150 (e.g., including input/output circuitry), a display 160 (e.g., including display circuitry), a communication interface 170 (e.g., including communication circuitry), and a camera 180. In another embodiment, the electronic device 101 may not include at least one of the components or may additionally include other components.

The bus 110, for example, may include a circuit that connects the components (120 to 180) and transmits signals (for example, control messages and/or data) among the components.

The processor 120 may include one or more of a Central Processing Unit (CPU), an Application Processor (AP), a Communication Processor (CP), and an Image Signal Processor (ISP). The processor 120, for example, can perform calculation or data processing about control and/or communication of one or more other components of the electronic device 101.

According to an embodiment, the processor 120 can detect at least one object from an image displayed on the display 160. For example, the processor 120 can detect characteristic points included in an image displayed on the display 160 by analyzing the image. The processor 120 can detect at least one object included in an image based on characteristic points included in the image. For example, the processor 120 can detect a plurality of sub-objects from one object detected from an image. In detail, when the processor 120 detects an object corresponding to a vehicle from an image, the processor 120 can divide a sub-object corresponding to the external shape of the vehicle and a sub-object corresponding to the logo of the vehicle. For example, when the processor 120 divides a plurality of sub-objects from one object, the processor 120 can acquire the detailed information of a sub-object by transmitting at least one sub-object to at least one server. The processor 120 can recognize an object including an object including the sub-object based on the detailed information of the sub-object. For example, by transmitting a plurality of sub-objects divided from an object to different servers corresponding to the sub-objects, respectively, the processor 120 can acquire the detailed information of the sub-objects. For example, by transmitting a plurality of sub-objects divided from an object to one server, the processor 120 can acquire the detailed information of the sub-objects. In this case, the processor 120 can transmit a format of detailed information to be acquired from a server to the server.

According to an embodiment, when the processor 120 detects an object from an image displayed on the display 160, the processor 120 can control the display 160 to display detection information of the object. For example, the processor 120 can control the display 160 to display detection information of an object detected from an image displayed on the display 160, using a graphic variable corresponding to the configuration information of the object. For example, the configuration information of an object may include at least one of the kind (for example, a text, an image, and an outline) of an object (or a sub-object), the shape (for example, the curvature, the height, and the form of a line) of an object (or a sub-object), and the color of an object. For example, when the processor 120 detects at least one object from an image, the processor 120 can control the display 160 to display detection information close to the object. For example, when the processor 120 divides a plurality of sub-objects from one object, the processor 120 can control the display 160 to display different detection information for the sub-objects, using graphic variables corresponding to the sub-objects, respectively. For example, when the processor 120 detects various properties (for example, a shape or a color) of one object (or a sub-object), the processor 120 can control the display 160 to display detection information corresponding to the various properties of the object (or the sub-object). For example, the graphic variable may include at least one of the form, color, contrast, definition, and size of detection information displayed close to an object detected by the processor 120 so that a user can recognize the object. The form of detection information may include various shapes such as a straight line, a curved line, a polygon, a circle, and a dot.

According to an embodiment, when the processor 120 detects a plurality of objects from an image displayed on the display 160, the processor 120 can control the display 160 to display detection information corresponding to the recognition status of the object. For example, when the processor 120 can detect a plurality of objects from an image displayed on the display 160, the processor 120 can recognize the objects. For example, the processor 120 may preferentially recognize a first object of a plurality of objects detected from an image. In this case, the processor 120 can control the display 160 to display detection information showing a recognition progression status for the first object and detection information showing recognition standby status for a second object. For example, when the processor 120 finishes recognizing the first object and recognizes the second object, the processor 120 can control the display 160 to display detection information showing a recognition completion status for the first object and detection information showing a recognition progression status for the second object. For example, when the processor 120 finishes recognizing the first object and the second object, the processor 120 can control the display 160 to display detection information showing a recognition completion status for the first object and the second object. In this case, the processor 120 can control the display 160 to display different detection information for the first object and the second object, using graphic variables corresponding to the configuration information of the first object and the second object. For example, the processor 120 can acquire the detailed information of the first object and the second object detected from an image by transmitting the objects to different servers corresponding to the objects, respectively. For example, the processor 120 can acquire the detailed information of the first object and the second object detected from an image by transmitting the objects to one server.

The memory 130 may include a volatile and/or nonvolatile memory. The memory 130 can store, for example, commands or data related to at least one other component of the electronic device 101. According to an embodiment, the memory 130 can store a graphic variable corresponding to the configuration information of an object (or a sub-object).

According to an embodiment, the memory 130 can store software and/or a program 140. For example, the program 140 may include a kernel 141, a middleware 143, an Application Programming Interface (API) 145, or an application program (or an "application") 147. At least some of the kernel 141, middleware 143, and API 145 may be referred to as an Operating System (OS).

The kernel 141, for example, can control or manage system resources (for example, the bus 110, processor 120, or memory 130) that are used to perform operations or functions that are implemented by other programs (for example, the middleware 143, the API 145, or the application program 147). Further, the kernel 141 can provide an interface that can control or manage system resources, by accessing individual components of the electronic device 101 via the middleware 143, API 145, or application program 147.

The middleware 143, for example, can function as a relay so that the API 145 or application program 147 can transmit and receive data by communicating with the kernel 141. Further, the middleware 143 can process one or more work requests received from the application program 147 in order of priority. For example, the middleware 143 can give a priority to be able to use system resources (for example, the bus 110, the processor 120, or the memory 130) of the electronic device 101 to at least one of the application programs 147 and process one or more work requests. The API 145, which is an interface for the application program 147 to control a function provided to the kernel 141 or the middleware 143, for example, may include at least one interface or function (for example, instruction) for file control, window control, image control, or text control.

The I/O interface 150 can transmit commands or data input from a user or another external device to other component(s) of the electronic device 101 or can output commands or data received from other component(s) of the electronic device 101 to a user or another external device. For example, the I/O interface 150 may include at least one physical button such as a home button, a power button, and a volume control button. For example, the I/O interface 150 may include a speaker for outputting audio signals and a microphone for collecting audio signals.

The display 160 can display various contents (for example, a text, an image, a video, an icon, and/or a symbol) to a user. For example, the display 160 may include a Liquid Crystal Display (LCD), a Light Emitting Diode (LED) display, an Organic Light Emitting Diode (OLED) display, or a Micro Electronic Mechanical System (MEMS) display, or an electronic paper display. For example, the display 160 may include a touch screen. For example, the display 160 can receive touching, gesturing, approaching, or hovering input by an electronic pen or a part of the body of a user.

The communication interface 170 can set communication between the electronic device 101 and an external device (for example, a first external electronic device 102, a second external electronic device 104, or a server 106). For example, the communication interface 170 can be connected to the network 172 and can communicate with an external device (for example, the second external electronic device 104 or the server 106) through wireless communication or wire communication.

According to an embodiment, wireless communication may include cellular communication using at least one of LTE, LTE-A (LTE Advance), Code Division Multiple Access (CDMA), Wideband CDMA (WCDMA), Universal Mobile Telecommunications System (UMTS), Wireless Broadband (WiBro), and Global System for Mobile Communications (GSM). According to an embodiment, wireless communication 174 may include at least one of Wireless Fidelity (WiFi), Bluetooth, Bluetooth Low Energy (BLE), Zigbee, Near Field Communication (NFC), magnetic secure transmission, Radio Frequency (RF), or Body Area Network (BAN). According to an embodiment, the wireless communication may include GNSS. For example, GNSS may be a Global Positioning System (GPS), a Global Navigation Satellite System (Glonass), a Beidou (Beidou Navigation Satellite System), or a Galileo (the European global satellite-based navigation system). In the following description, "GPS" may be used compatibly with "GNSS". According to an embodiment, wire communication may include at least one of a Universal Serial Bus (USB), a High Definition Multimedia Interface (HDMI), an RS-232 (Recommended Standard-232), power-line communication, and a Plain Old Telephone Service (POTS). The network 172 may include at least one of telecommunication networks, for example, a computer network (for example, LAN or WAN), the internet, and a telephone network.

The first and second external electronic device 102 and 104 may be devices the same as or different from the electronic device 101. According to various embodiments, all or some of operations that are performed by the electronic device 101 may be performed by another electronic device or a plurality of other electronic devices (for example, the electronic devices 102 and 104 or the server 106). According to an embodiment, when the electronic device 101 has to perform a function or service automatically or due to a request, the electronic device 101 can request at least partial function related to the function or service to another device (for example, the electronic devices 102 and 104 or the server 106) additionally or instead of performing the function or service by itself. Another electronic device (for example, the electronic devices 102 and 104 or the server 106) can perform the requested function or the additional function and transmit the result to the electronic device 101. The electronic device 101 can provide the requested function or service based on the received result or by additionally processing the received result. To this end, for example, cloud computing, distributed computing, or client-server computing may be used.

The camera 180 can take still images (pictures) and moving images by collecting image information about a subject. For example, the camera 180 can be controlled to photograph a subject by the processor 120. The camera 180 can transmit photographed data (for example, images) to the display 160 and the processor 120. For example, the camera 180 may include at least one of an image sensor, a lens, an Image Signal Processor (ISP), and a flash (for example, an LED or a xenon lamp). For example, the image sensor may be a Charged Coupled Device (CCD) or a Complementary Metal-Oxide Semiconductor (CMOS). According to an embodiment, the camera 180 may include a plurality of cameras. For example, the camera 180 may include a plurality of cameras disposed on the front or rear side of the electronic device 101. For example, the camera 180 may include a plurality of cameras disposed on the rear side of the electronic device 101.

Figure 2:
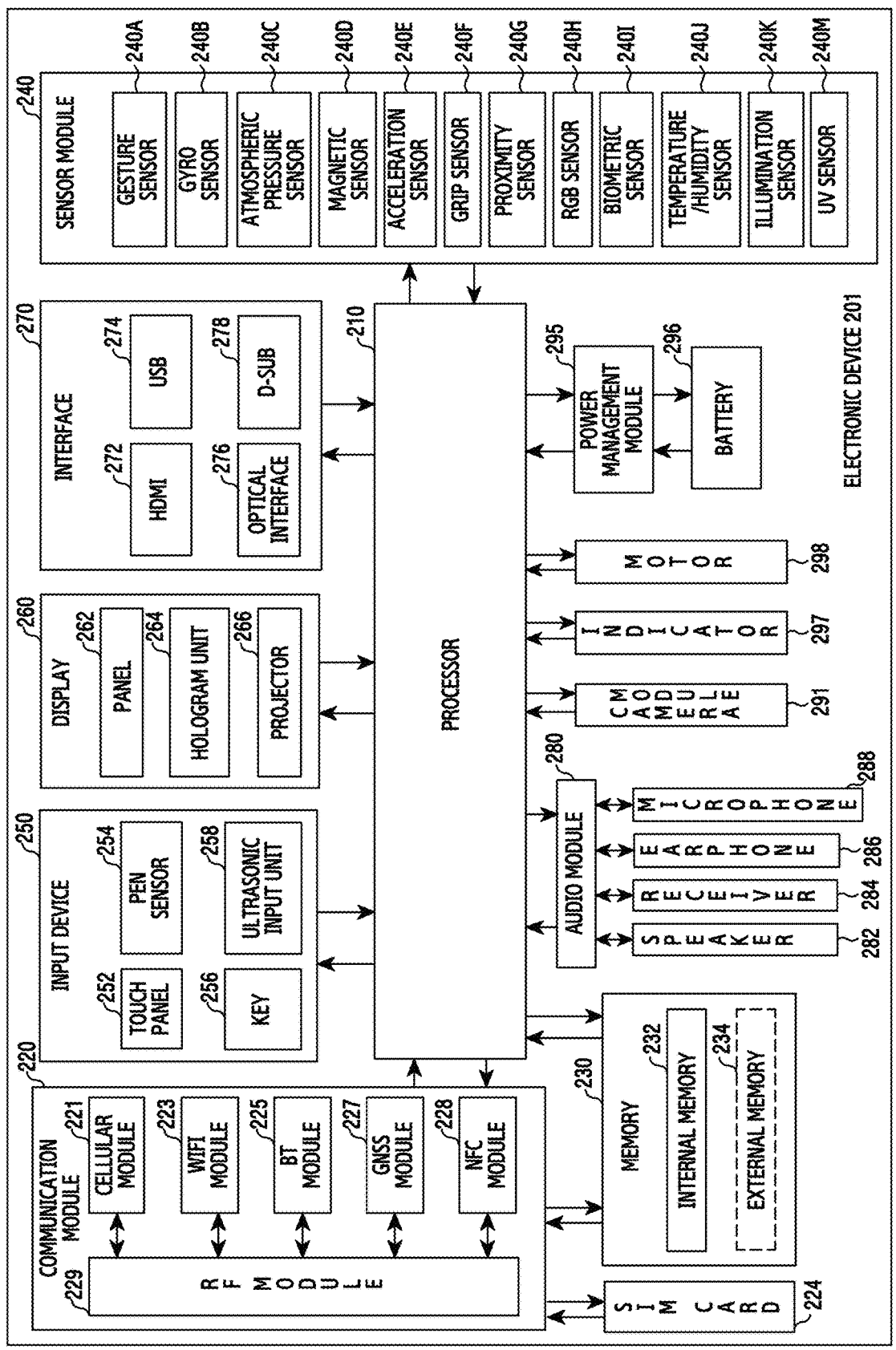
FIG. 2 illustrates a block diagram of an electronic device according to various embodiments.

FIG. 2 illustrates a block diagram of an electronic device 201 according to various embodiments. The electronic device 201, for example, may include the entire or a portion of the electronic device 101 shown in FIG. 1. The electronic device 201 may include one or more processors 210 (for example, AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210, for example, can control a plurality of hardware or software components connected to the processor 210 by operating an operating system or an application and can perform processing and calculation on various data. The processor 210, for example, may be a System on Chip (SoC). According to an embodiment, the processor 210 may further include a Graphic Processing Unit (GPU) and/or an Image Signal Processor (ISP). The processor 210 may include at least some (a cellular module 221) of the components shown in FIG. 2. The processor 210 can load and process commands or data received from other components (for example, a nonvolatile memory) on a volatile memory and can store the resultant data on a nonvolatile memory.

According to an embodiment, the processor 210 can control the display 260 to display detection information corresponding to the configuration information of an object detected from an image displayed on the display 260. For example, the configuration information of an object may include at least one of the kind of an object (or a sub-object), the shape of an object (or a sub-object), and the color of an object. The kind of an object may include at least one of a texture, an image, an outline, an Optical Character Reader (OCR), a barcode, a Quick Response (QR) code, and a logo, and the shape of an object may include at least one of the curvature, a height, and a form of an outline The communication module 220 may have a configuration the same as or similar to that of the communication interface 170 shown in FIG. 1. The communication module 220, for example, may include a cellular module 221, an WiFi module 223, a Bluetooth module 225, an GNSS module 227, an NFC module 228, and an RF module 229.

The cellular module 221, for example, can provide a voice call, a video call, a text service, or an internet service through a communication network. According to an embodiment, the cellular module 221 can identify and authenticate the electronic device 201 in a communication network, using a subscriber identification module 224 (for example, a SIM card). According to an embodiment, the cellular module 221 can perform at least some of the functions that the processor 210 can provide. According to an embodiment, the cellular module 221 may include a Communication Processor (CP).

According to another embodiment, at least some (for example, two or more) of the cellular module 221, WiFi module 223, Bluetooth module 225, GNSS module 227, and NFC module 228 may be included in one Integrated Chip (IC) or IC package.

The RF Module 229, for example, can transmit and receive communication signals (for example, RF signals). The RF module 229, for example, may include a transceiver, a Power Amp Module (PAM), a frequency filter, a Low Noise Amplifier (LNA), or an antenna. According to another embodiment, at least one of the cellular module 221, WiFi module 223, Bluetooth module 225, GNSS module 227, and NFC module 228 can transmit and receive RF signals through a separate RF module. The subscriber identification module 224, for example, may include a card including a subscriber identification module or an embedded SIM and may include unique identification information (for example, Integrated Circuit Card Identifier (ICCID) or subscriber information (for example, International Mobile Subscriber Identity (IMSI)).

The memory 230 (for example, the memory 130 shown in FIG. 1), for example, may include a built-in memory 232 or an external memory 234. The built-in memory 232, for example, may include at least one of a volatile memory (for example, a DRAM, an SRAM, or an SDRAM) and a nonvolatile memory (for example, a One Time Programmable ROM (OTPROM), a PROM, an EPROM, an EEPROM, a mask ROM, a flash ROM, a flash memory, a hard drive, or a Solid State Drive (SSD). The external memory 234 may include a flash drive, for example, a Compact Flash (CF), a Secure Digital (SD), a Micro-SD, a Mini-SD, an Extreme Digital (xD), a Multi-Media Card (MMC), or a memory stick. The external memory 234 can be functionally or physically connected to the electronic device 201 through various interfaces.

The sensor module 240, for example, can measure physical quantities or sense operation states of the electronic device 201 and can convert the measured or sensed information into electrical signals. The sensor module 240, for example, may include at least one of a gesture sensor 240A, a gyro sensor 240B, a barometer sensor 240C, a magnetic sensor 240D, an acceleration sensor 240E, a grip sensor 240F, a proximity sensor 240G, a color sensor 240H (for example, an RGB (red, green, blue) sensor), a biosensor 240I, a temperature/moisture sensor 240J, an illumination sensor 240K, and an Ultraviolet (UV) sensor 240M. Additionally or alternatively, the sensor module 240, for example, may include an e-nose sensor, an Electromyography (EMG) sensor, an Electroencephalogram (EEG) sensor, an Electrocardiogram (ECG) sensor, an Infrared (IR) sensor, an iris sensor, and/or a fingerprint sensor. The sensor module 240 may further include a control circuit for controlling one or more sensors therein. In another embodiment, the electronic device 201 may further include a processor configured to control the sensor module 240, separately or as a part of the processor 210, whereby it is possible to control the sensor module 240 while the processor 210 is in a sleep state.

The input device 250, for example, may include a touch panel 252, a (digital) pen sensor 254, a key 256, or an ultrasonic input device 258. The touch panel 252, for example, may use at least one of electrostatic, decompressing, infrared, and ultrasonic methods. The touch panel 252 may further include a control circuit. The touch panel 252 can provide a touch response (touch coordinates) to a user by further including a tactile layer. The (digital) pen sensor 254, for example, may include a recognition sheet that is a part of the touch panel or a separate part. The key 256, for example, may include a physical button, an optical button, or a keypad. The ultrasonic input device 258 can sense an ultrasonic wave generated from an input tool through a microphone (for example, a microphone 288) and find data corresponding to the sensed ultrasonic wave.

The display 260 may include a panel 262, a hologram device 264, a projector 266, and/or a control circuit for controlling these components. The panel 262, for example, may be implemented to be flexible, transparent, or wearable. The panel 262 may be configured as one or modules together with the touch panel 252. According to an embodiment, the panel 262 may include a pressure sensor (for example, a force sensor) that can measure pressure information (for example, pressure coordinates and intensity of pressure) about a touch by a user. The pressure sensor may be integrated with the touch panel 252 or may be composed of one or more sensors separated from the touch panel 252. The hologram device 264 can show 3D images in the air, using interference of light. The projector 266 can show images by projecting light to a screen. The screen, for example, may be positioned inside or outside the electronic device 201. The interface 270, for example, may include an HDMI 272, a USB 274, an optical interface 276, or a D-subminiature (D-sub) 278. The interface 270, for example, may be included in the communication interface 170 shown in FIG. 1. Additionally or alternatively, the interface 270, for example, may include a Mobile High-definition Link (MHL) interface, an SD card/Multi-Media Card (MMC) interface, or an interface under Infrared Data Association (IrDA).

The audio module 280, for example, can convert a sound into an electrical signal and vice versa. At least some components of the audio module 280, for example, may be included in the I/O interface 150 shown in FIG. 1. The audio module 280, for example, can process sound information input or output through a speaker 282, a receiver 284, an earphone 286, or a microphone 288. The camera module 291 (for example, the camera 180 shown in FIG. 1, for example, is a device that can take still images and moving images, and according to an embodiment, the camera module 291 may include one or more image sensors (for example, front sensors or rear sensors), lenses, ISPs, or flashes (for example, LEDs or xenon lamps). The power management module 295, for example, can manage power of the electronic device 201. According to an embodiment, the power management module 295 may include a Power Management Integrated Circuit (PMIC), a charging IC, or a battery or fuel gauge. The PMIC may have a wire and/or wireless charging method. The wireless charging method, for example, includes a magnetic resonance method, a magnetic induction method, or an electromagnetic wave method, and may further include an additional circuit for wireless charging, for example, a coil loop, a resonant circuit, or a rectifier. The battery gauge, for example, can measure the remaining capacity, or a voltage, a current, or temperature in charging of a battery 296. The battery 296, for example, may include a chargeable battery and/or a solar battery.

The indicator 297 can show specific statuses such as a booting status, a message status, or a charging status of the electronic device 201 or some (for example, the processor 210) of the electronic device 201. The motor 298 can convert electrical signals into mechanical vibration and can generate vibration or a haptic effect. The electronic device 201, for example, may include a mobile TV support device (for example, a GPU) that can process media data following standards such as Digital Multimedia Broadcasting (DMB), Digital Video Broadcasting (DVB), or mediaFlo™. The components described herein each may be composed of one or more elements and the names of the parts may depend on the kinds of electronic devices. In various embodiments, an electronic device (for example, the electronic device 201) may not include some of the components, may further include additional components, or may be configured as one part by combining some of the components, and can perform the functions of the components before combining.

Figure 3:
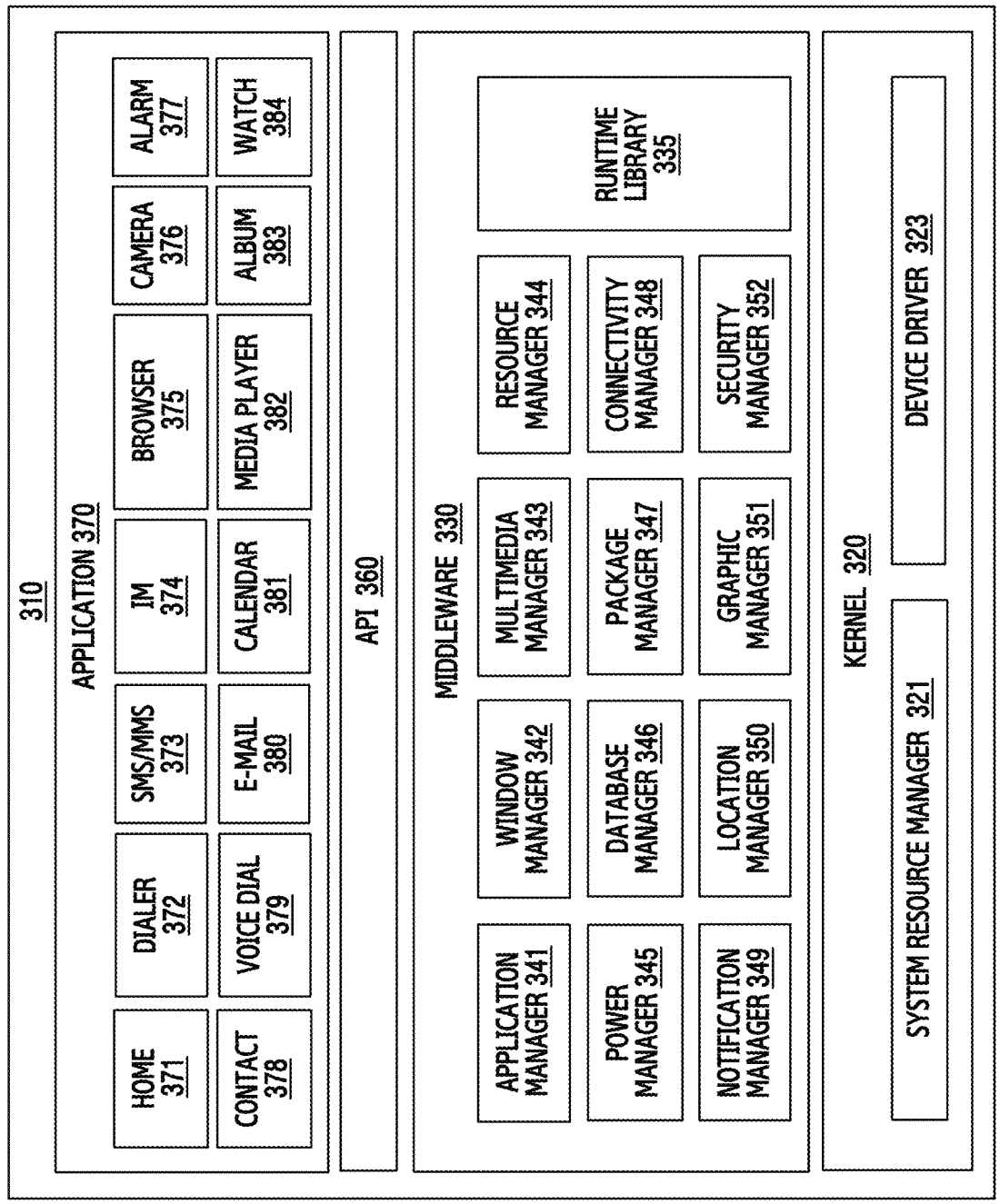
FIG. 3 illustrates a block diagram of a program module according to various embodiments.

FIG. 3 illustrates a block diagram of a program module according to various embodiments. According to an embodiment, a program module 310 (for example, the program 140 shown in FIG. 1) may include an operating system, which controls resources related to an electronic device (for example, the electronic device 101 shown in FIG. 1), and/or various applications (for example, the application program 147 shown in FIG. 1) that are executed on an operating system. The operating system, for example, may include Android™, iOS™, Windows™, Symbian™, Tizen™, or Bada™.

Referring to FIG. 3, a program module 310 may include a kernel 320 (for example, the kernel 141 shown in FIG. 1), a middleware 330 (for example, the middleware 143 shown in FIG. 1), an API 360 (for example, the API 145 shown in FIG. 1), and/or an application 370 (for example, the application program 147 shown in FIG. 1). At least a portion of the program module 310 can be pre-loaded on an electronic device or can be downloaded from an external electronic device (for example, the electronic devices 102 and 104 and the server 106 shown in FIG. 1).

The kernel 320, for example, may include a system resource manager 321 and/or a device driver 323. The system resource manager 321 can control, allocate, or recover system resources. According to an embodiment, the system resource manager 321 may include a process manager, a memory manager, or a file system manager. The device driver 323, for example, may include a display driver, a camera driver, a Bluetooth driver, a shared memory driver, a USB driver, a keypad driver, a WiFi driver, an audio driver, a touch device driver, a pressure device driver, or an Inter-Process Communication (IPC) driver.

The middleware 330, for example, can provide functions that all of the applications 370 use, or can provide various functions to the applications 370 through the API 360 so that the application 370 can use limited system resources of an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335, for example, may include a library module that is used by a compiler to add new functions, using a programming language while the application 370 is executed. The runtime library 335 can perform input/output management, memory management, or calculation function processing. The application manager 341, for example, can manage the lifecycle of the application 370. The window manager 342 can manage a GUI resource that is used for the screen. The multimedia manager 343 can find the formats for playing media files and encode or decode the media files, using codecs corresponding to the formats. The resource manager 344 can manage the source code of the application 370 or the space of a memory. The power manager 345, for example, can manage the capacity of a battery or power and provide power information for operating an electronic device. According to an embodiment, the power manager 345 can operate together with a Basic Input/Output System (BIOS). The database manager 346, for example, can create, search for, or change a database to be used by the application 370. The package manager 347 can manage installation or update of applications that are released in the type of a package file.

The connectivity manager 348, for example, can manage wireless connection. The notification manager 349, for example, can provide events such as an arrived message, a promise, and notification of proximity to a user. The location manager 350, for example, can manage the location information of an electronic device. The graphic manager 351, for example, can manage a graphic effect to be provided to a user or a user interface related to the graphic effect. According to an embodiment, when an object is detected from an image displayed on the display 160, the graphic manager 351 can manage a graphic effect displaying detection information corresponding to the configuration information of the object.

The security manager 352, for example, can provide system security or user authentication. According to an embodiment, the middleware 330 may include a telephony manager for managing a voice or video call function of an electronic device or a middleware module that can generate combinations of the functions of the components described above. According to an embodiment, the middleware 330 can provide modules specified for the kinds of operating systems. The middleware 330 can dynamically delete some of existing component or add new components. The API 360, for example, may be provided to have different configurations, depending on operating systems, as a set of API programming functions. For example, for Android™ or iOS™, one API set can be provided for each platform, and for Tizen™, two or more API sets can be provided for each platform.

The application 370, for example, may include home 371, dialer 372, SMS/MMS 373, Instant Message (IM) 374, browser 375, camera 376, alarm 377, contact 378, voice dial 379, email 380, calendar 381, medial player 382, album 383, watch 384, healthcare (for example, measuring the amount of exercise or blood sugar), or environment information (for example, atmospheric pressure, humidity, or temperature information) providing applications. According to an embodiment, the application 370 may include an information exchange application that can support information exchange between an electronic device and an external electronic device. The information exchange application, for example, may include a notification relay application for transmitting specific information to an external electronic device or a device management application for managing an external electronic device. For example, a notification transmission application can transmit notification information generated by another application of an electronic device to an external electronic device, or can receive notification information from an external electronic device and provide the notification information to a user. The device management application, for example, can install, delete, or update the functions of an external electronic device communicating with an electronic device (fore example, turning-on/of of the external electronic device (or some components) or adjustment of brightness (or resolution) of a display), or an application that is executed in an external electronic device. According to an embodiment, the application 370 may include an application designated in accordance with the property of an external electronic device (for example, a healthcare application of a mobile medical device). According to an embodiment, the application 370 may include an application received from an external electronic device. At least a portion of the program module 310 can be implemented (for example, executed) in software, firmware, hardware (for example, the processor 210), or a combination of at least two of them, and may include a module, a program, a routine, an instruction set, or a process for performing one or more functions.

According to various embodiments, an electronic device includes a display, at least one processor, and a memory coupled to the processor. The memory can store instructions that, when being executed, make the processor control the display to display an image, detect at least one object from the image, and control the display to display detection information corresponding to the at least one object based on the configuration information of the at least one object.

According to various embodiments, the configuration information of the at least one object may include at least one of a kind, a shape, or a color of the at least one object.

According to various embodiments, the instructions may include instructions that make the processor divide a plurality of sub-objects from the at least one object detected from the image, determine graphic variables corresponding to the configuration information of the sub-objects, and control the display to display detection information corresponding to the sub-objects based on the graphic variables corresponding to the configuration information of the sub-objects.

According to various embodiments, the graphic variable may include at least one of a form, a color, a contrast, a definition, or a size of detection information.

According to various embodiments, the display is further configured to display detection information corresponding to the at least one object close to an outline of the at least one object.

According to various embodiments, the instructions may include instructions that make the processor detect at least one graphic variable corresponding to an outline of the at least one object based on a curvature of the outline the at least one object, and control the display to display detection information showing a change in curvature of the outline of the object based on the graphic variable corresponding to the outline.

According to various embodiments, a communication interface is further included, and the instructions may include instructions that make the processor divide a plurality of sub-objects from the object detected from the image, control the communication interface to transmit at least one sub-object of the plurality of sub-objects to at least one server corresponding to the sub-object, receive detailed information of the sub-objects through the communication interface, and recognize the object detected from the image based on the detailed information of the sub-object when the items of detailed information of the sub-object correspond to each other.

According to various embodiments, a communication interface is further included, and the instructions may include instructions that make the processor divide a plurality of sub-objects from the object detected from the image, select important sub-object of the plurality of sub-objects, control the communication interface to transmit the important sub-object to a server, receive detailed information of the important sub-object through the communication interface, and recognize the object detected from the image based on the detailed information of the important sub-object.

According to various embodiments, the instructions may store instructions that make the processor, when a plurality of objects is detected from the image, recognize the object, detect graphic variables corresponding to recognition statuses of the object, and control the display to display detection information corresponding to the objects based on the graphic variables corresponding to the recognition statuses of the objects.

According to various embodiments, a camera is further included, and the instructions may store instructions that make the processor control the display to display an image acquired through the camera.

Figure 4:
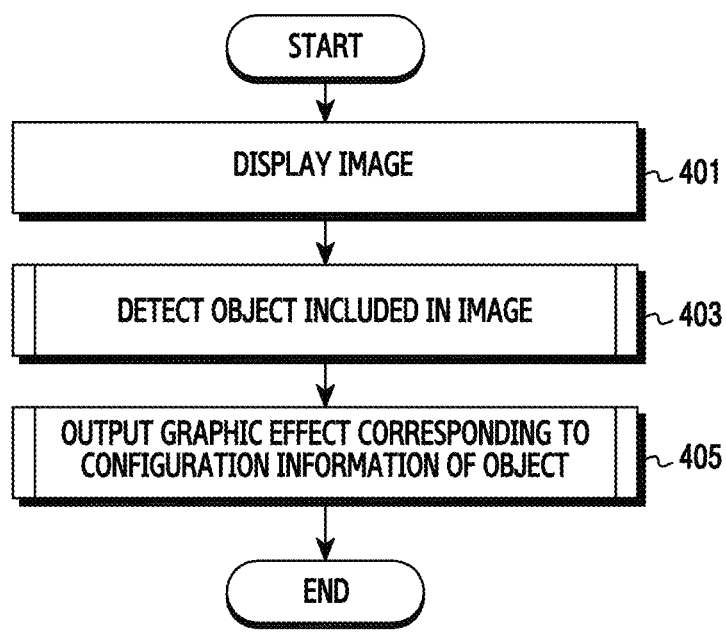
FIG. 4 illustrates a flowchart for displaying a graphic effect corresponding to the configuration information of an object in an electronic device according to various embodiments.
Figure 5:
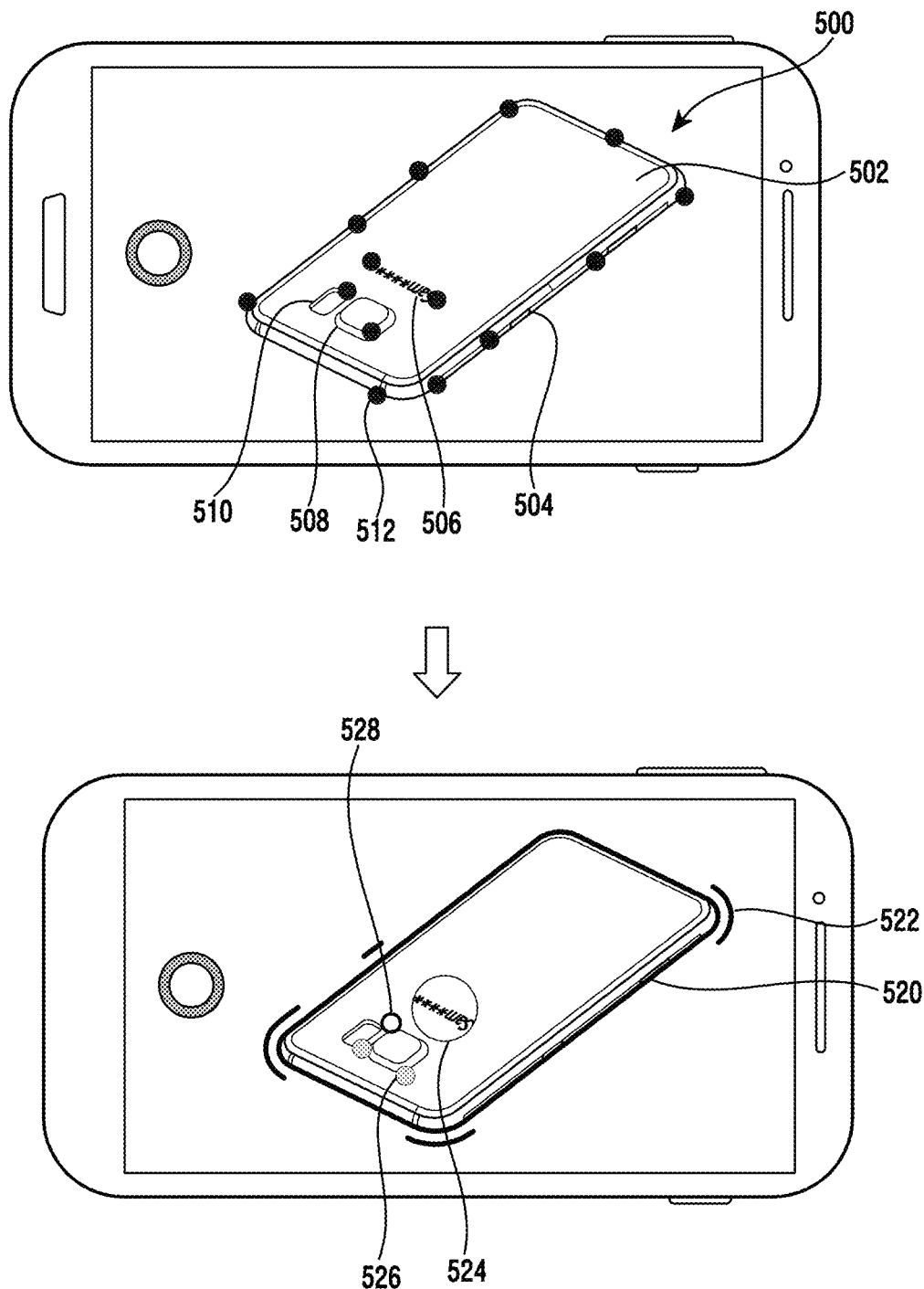
FIG. 5 illustrates a screen configuration displaying a graphic effect corresponding to the configuration information of an object in an electronic device according to various embodiments.

FIG. 4 illustrates a flowchart for displaying a graphic effect corresponding to the configuration information of an object in an electronic device according to various embodiments. FIG. 5 illustrates a screen configuration displaying a graphic effect corresponding to the configuration information of an object in an electronic device according to various embodiments. In the following description, an electronic device may include the electronic device 101 shown in FIG. 1 or at least a portion (for example, the processor 120) of the electronic device 101.

Referring to FIG. 4, an electronic device can display at least one image on a display in operation 401. For example, when the processor 120 detects occurrence of an event for activating a camera application, the processor 120 can control the camera 180 to be activated. The processor 120, as shown in FIG. 5, can control the display 160 to display an image 500 (for example, a preview image) acquired through the camera 180. For example, when the processor 120 detects occurrence of an event for displaying an image list, the processor 120 can control the display 160 to display an image list stored in the memory 130. The processor 120 can control the display 160 to display at least one image corresponding to input information detected through the I/O interface 150 from the image list displayed on the display 160.

The electronic device can detect at least one object from an image displayed on a display in operation 403. For example, the processor 120, as shown in FIG. 5, can detect a mobile phone-shaped object 502 included in an image by extracting characteristic points of the image 500 displayed on the display 160. For example, the processor 120 can divide a plurality of sub-objects such as an external shape 504, a logo 506, a projective area 508 of the external shape (for example, a camera area), and a recessed area 510 of the external shape (for example, a light area) from the mobile phone-shaped object 502. For example, by transmitting at least one sub-object of the sub-objects 504 to 510 divided from the object 502 to a server corresponding to the sub-object, the processor 120 can acquire detailed information of the sub-object. The processor 120 determines the object detected from the image based on the detailed information of the sub-object.

The electronic device can output a graphic effect corresponding to the configuration information of an object detected from an image displayed on a display in operation 405. For example, when the processor 120, as shown in FIG. 5, detect one object 502 from the image 500, the processor 120 can control the display 160 to display detection information 512 close to the object 502. For example, when the processor 120 divides the object 502 detected from the image 500 into a plurality of sub-objects or recognizes sub-objects using at least one server, the processor 120 can detect graphic variables corresponding to the configuration information of the sub-objects. The processor 120 can control the display 160 to display different detection information for the sub-objects based on the graphic variables corresponding to the configuration information of the sub-objects to be able to discriminate the sub-objects, using the detection information. For example, the processor 120, as shown in FIG. 5, can control the display 160 to display items of detection information 520 and 522 in line types on the external shape 504 of the object 502. In this case, the processor 120 can control the display 160 to display different line 520 or 522 corresponding to the curvature of the external shape 504. For example, the processor 120, as shown in FIG. 5, can control the display 160 to display detection information 524 in a circular type on the logo 506 of the object 502. For example, the processor 120, as shown in FIG. 5, can control the display 160 to display black dot-shaped detection information 526 on the projective area 508 of the external shape of the object 502. For example, the processor 120, as shown in FIG. 5, can control the display 160 to display transparent dot-shaped detection information 528 on the recessed area 510 of the external shape of the object 502.

Figure 6:
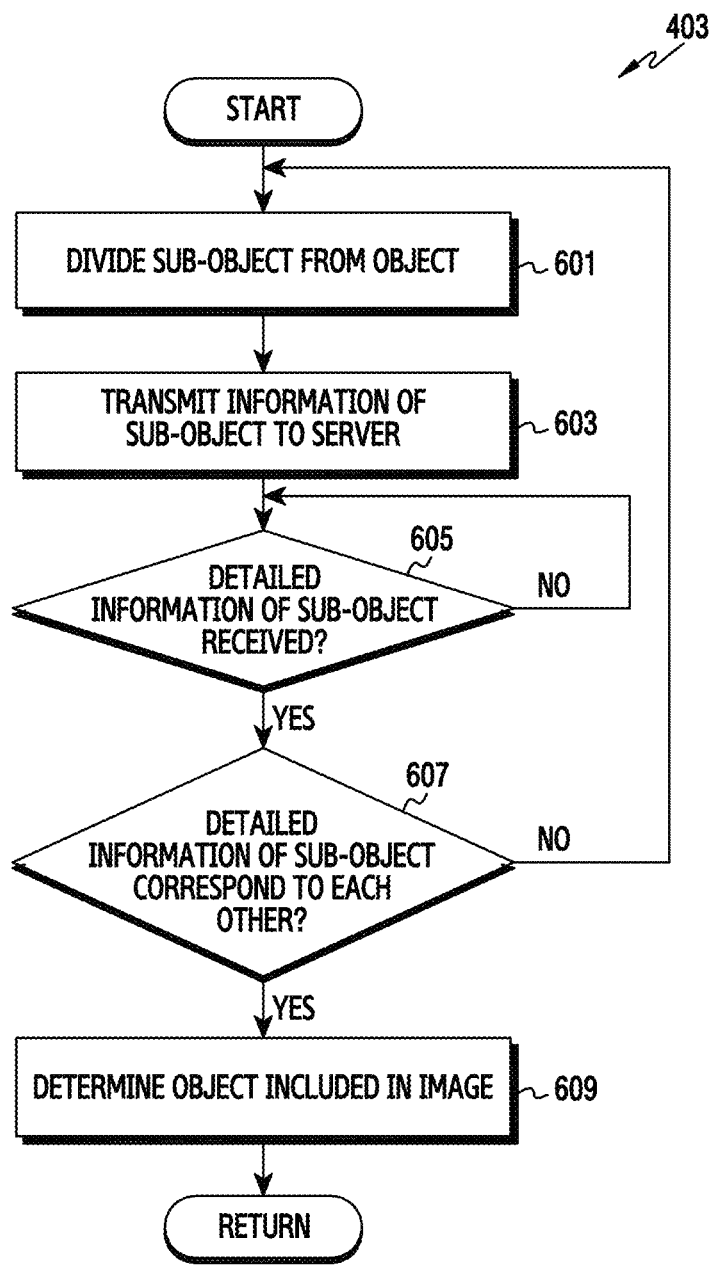
FIG. 6 illustrates a flowchart for acquiring recognition information of an object through a server in an electronic device according to various embodiments.
Figure 7:
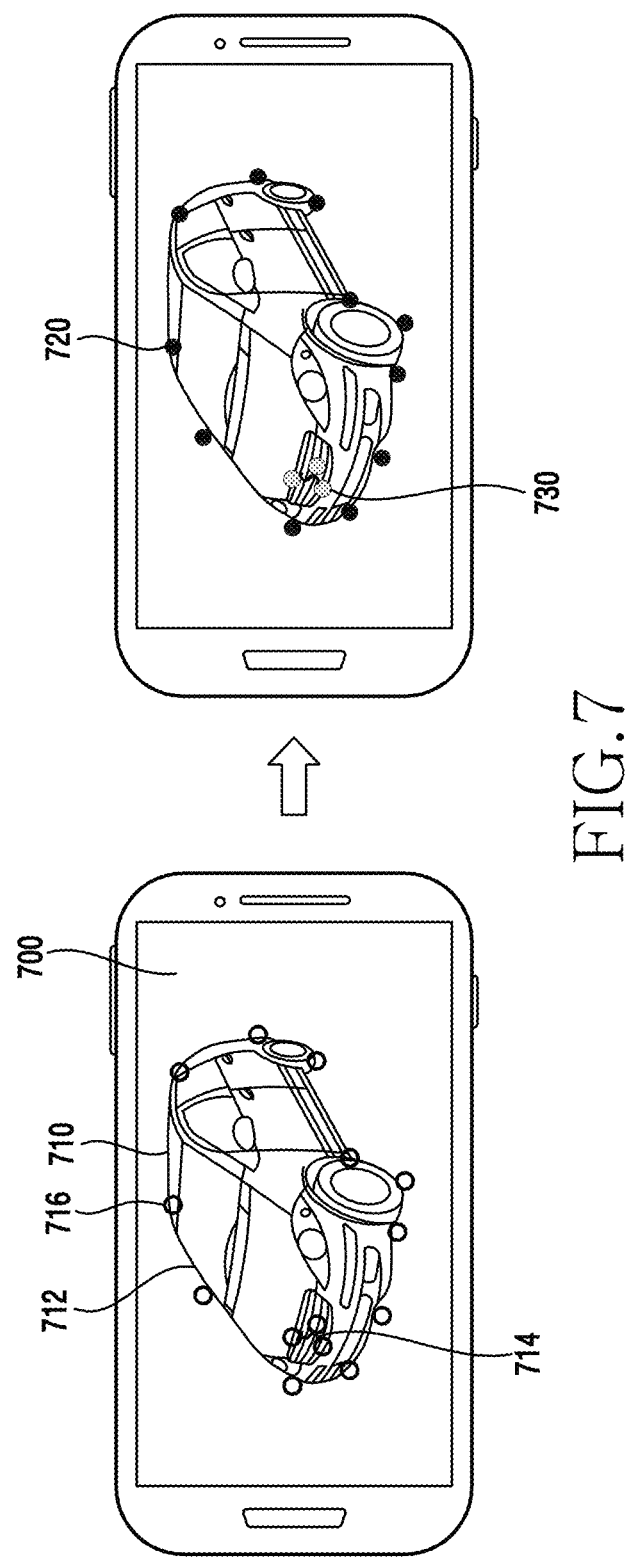
FIG. 7 illustrates a screen configuration displaying a graphic effect corresponding to the kind of an object in an electronic device according to various embodiments.

FIG. 6 illustrates a flowchart for acquiring recognition information of an object through a server in an electronic device according to various embodiments. FIG. 7 illustrates a screen configuration displaying a graphic effect corresponding to the kind of an object in an electronic device according to various embodiments. An operation for detecting an object included in an image in operation 403 shown in FIG. 4 is described hereafter. In the following description, an electronic device may include the electronic device 101 shown in FIG. 1 or at least a portion (for example, the processor 120) of the electronic device 101.

Referring to FIG. 6, when an electronic device displays an image on a display (for example, operation 401 shown in FIG. 4), the electronic device can divide an object detected from the image displayed on the display into a plurality of sub-objects in operation 601. For example, the processor 120, as shown in FIG. 7, can control the display 160 to display an image 700 (for example, a preview image) acquired through the camera 180. The processor 120 can detect an object 710 by extracting characteristic points from the image 700. The processor 120 can divide the object 710 into an external shape 712 and a logo 714.

The electronic device, in operation 603, can transmit information of a plurality of sub-objects divided from the object to servers corresponding to the sub-objects. For example, the processor 120 can control the communication interface 170 to transmit the external shape 712 divided from the object 710 shown in FIG. 7 to a first server and transmit the logo 714 to a second server. For example, the processor 120 can control the communication interface 170 to transmit the external shape 712 and the logo 714 divided from the object 710 shown in FIG. 7 to a third server. In this case, the processor 120 can transmit a type of detailed information to be acquired from the third server to the third server For example, the processor 120 can transmit request information for separately acquiring detailed information of the external shape 712 and detailed information of the logo 714 to a server. For example, the processor 120 can designate any one sub-object, of which the detailed information is acquired from the third server, of the external shape 712 and the logo 714. For example, the processor 120 can transmit request information for acquiring related detailed information of the external shape 712 and the logo 714 to a server.

The electronic device, in operation 605, can check whether detailed information of the sub-objects is received from the servers. For example, the processor 120 can check whether detailed information corresponding to the external shape 712 of the object 710 is received from the first server, through the communication interface 170. The processor 120 can check whether detailed information corresponding to the logo 714 of the object 710 is received from the second server, through the communication interface 170. For example, when the processor 120 does not receive detailed information of a sub-object even though a reference time passes from a point of time to transmit information of the sub-object to a server, the processor 120 can control the communication interface 170 to transmit again the information of the sub-object to a server. For example, the processor 120 can check whether detailed information corresponding to the external shape 712 and the logo 714 of the object 710 is received from the third server, through the communication interface 170. In this case, the processor 120 can receive the detailed information of the type requested to the third server.

When the electronic device receives detailed information of sub-objects from servers, the electronic device, in operation 607, can check whether the items of detailed information of the sub-objects correspond to each other. For example, the processor 120 can check whether product information corresponding to the external shape 712 and company information corresponding to the logo 714, which are acquired from the servers, correspond to each other.

When the items of detailed information of the sub-objects received from the servers do not correspond to each other, the electronic device can determine that an error occurred at the point of time of detecting the object from the image or dividing the sub-objects. Accordingly, the electronic device can detect again an object from the image in operation 601.

When the items of detailed information of the sub-objects received from the servers correspond to each other, the electronic device, in operation 609, can determine that the object included in the image based on the detailed information of the sub-objects acquired from the servers. For example, the processor 120 can recognize the information of the object 710 detected from the image, based on the company information of the logo 714 and the product information of the external shape 712 acquired from the servers.

According to an embodiment, when the electronic device detects an object from an image displayed on the display 160, the electronic device can display detection information of the object. For example, the processor 120, as shown in FIG. 7, can control the display 160 to display transparent dot-shaped detection information 716 close the object 710 detected from the image 700.

According to an embodiment, when the electronic device divides and recognizes sub-objects, that is, the external shape 712 and the logo 714 from the vehicle-shaped object 710, the electronic device can display different types of items of detection information on the sub-objects 712 and 714 based on graphic variables corresponding to configuration information of the sub-objects 712 and 714. For example, when the processor 120, as shown in FIG. 7, divides sub-objects, that is, the external shape 712 and the logo 714 from the vehicle-shaped object 710, the processor 120 can control the display 160 to display detection information of the external shape 712 in a dark dot type 720 based on the kinds of the sub-objects. The processor 120 can control the display 160 to display detection information of the logo 714 in a light dot shape 730 based on the kinds of the sub-objects.

According to an embodiment, when a server receives a plurality of objects (or sub-objects) from the electronic device, the server can search the objects (sub-objects) corresponding to the type of detailed information that the electronic device uses. For example, the server can search detailed information of the objects (or sub-objects) received from the electronic device. For example, the server can search detailed information of the objects by associating the objects (or sub-objects) received from the electronic device. For example, the server can search for vehicle information of the external shape 712 corresponding to the logo 714 received from the electronic device.

Figure 8:
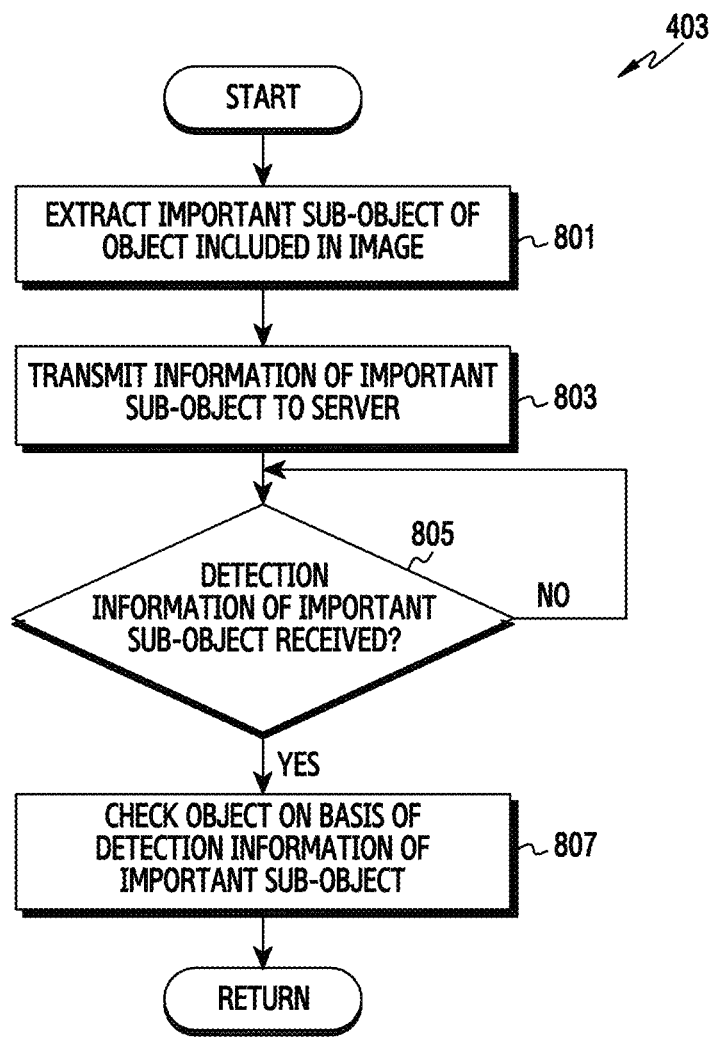
FIG. 8 illustrates a flowchart for recognizing an object based on detection information of important objects in an electronic device according to various embodiments.

FIG. 8 illustrates a flowchart for recognizing an object based on detection information of important objects in an electronic device according to various embodiments. An operation for detecting an object included in an image in operation 403 shown in FIG. 4 is described hereafter. In the following description, an electronic device may include the electronic device 101 shown in FIG. 1 or at least a portion (for example, the processor 120) of the electronic device 101.

Referring to FIG. 8, when an electronic device displays an image on a display (for example, operation 401 shown in FIG. 4), the electronic device can extract important objects from objects detected from the image displayed on the display in operation 801. For example, the processor 120, as shown in FIG. 7, can detect the object 710 from the image 700 (for example, a preview image) acquired through the camera 180. The processor 120 can detect the logo 714 as an important sub-object of the object 710 based on predetermined priorities of sub-objects, in the external shape 712 and the logo 714 included in the object 710. For example, the priorities of sub-objects may be set based on the kinds of sub-objects.

The electronic device, in operation 803, can transmit information of the important sub-object extracted from the object to a server corresponding to the important sub-object. For example, the processor 120 can control the communication interface 170 to transmit the logo 714 that is the important sub-object extracted from the object 710 shown in FIG. 7 to a logo server.

The electronic device, in operation 805, can check whether detailed information of the important sub-objects is received from the server. For example, the processor 120 can check whether detailed information corresponding to the logo 714 of the object 710 is received from the logo server, through the communication interface 170. For example, when the processor 120 does not receive detailed information of the important sub-object even though a reference time passes from a point of time to transmit information of the important sub-object to a server, the processor 120 can control the communication interface 170 to transmit again the information of the important sub-object to a server. When the number of times of transmitting the information of the important sub-object exceeds a reference number of times, the processor 120 can determine that the processor 120 has failed to recognize the object.

When the electronic device receives detailed information of the important sub-object from a server, the electronic device can determine the object included in the image based on the detailed information of the important sub-object in operation 807. For example, the processor 120 can update (limit) reference external shape list to be used to determine the external shape 712 based on the company information of the logo 714 acquired from the logo server. The processor 120 can detect a reference external shape corresponding to the external shape 712 of the object 710 from the reference external shape list limited based on the company information of the logo 714. The processor 120 can recognize information (for example, the product name) of the object 710 detected from the image 700 based on the reference external corresponding to the external shape 712 of the object 710.

Figure 9:
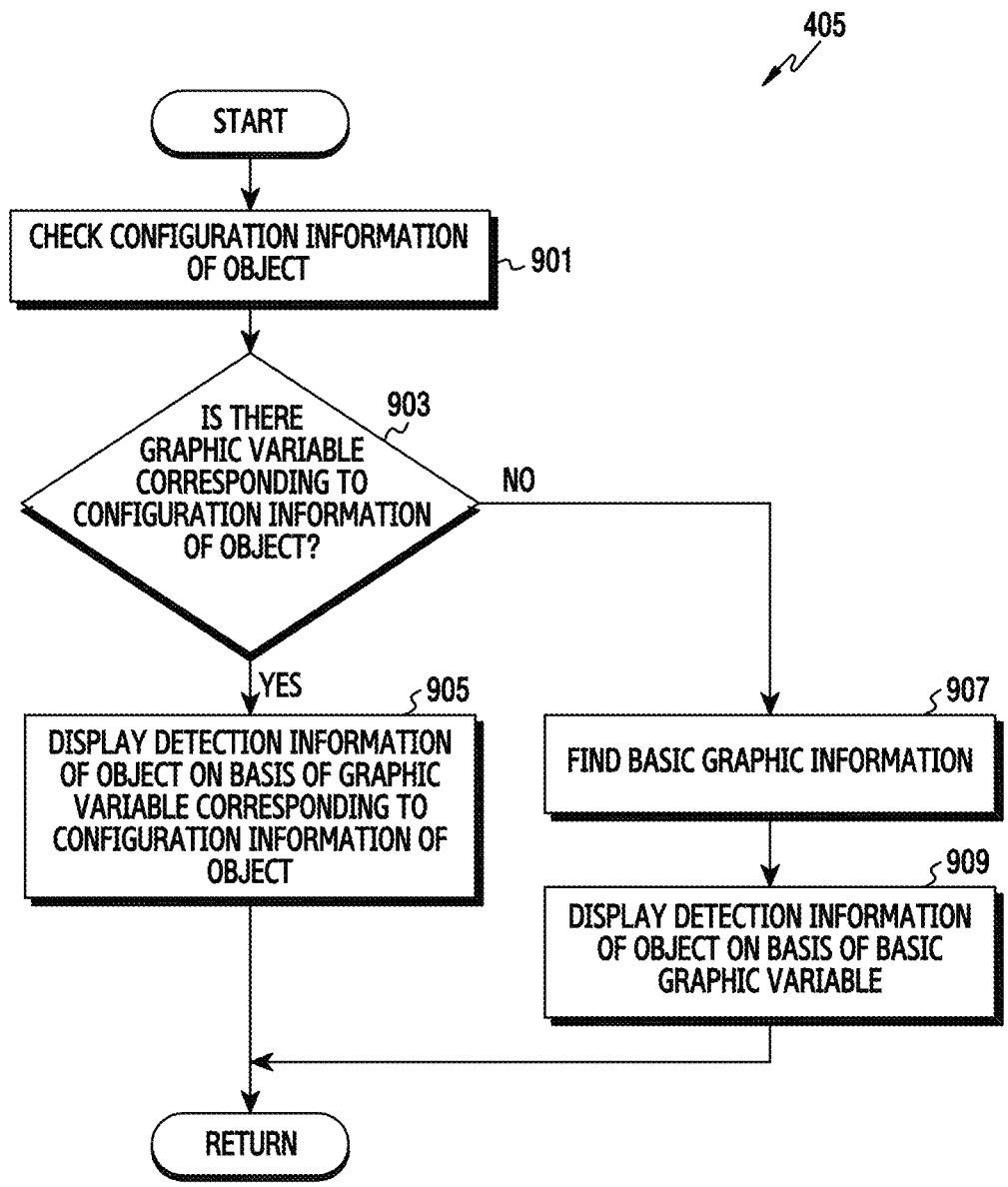
FIG. 9 illustrates a flowchart for detecting a graphic effect corresponding to the configuration information of an object in an electronic device according to various embodiments.

FIG. 9 illustrates a flowchart for detecting a graphic effect corresponding to the configuration information of an object in an electronic device according to various embodiments. An operation for outputting a graphic effect corresponding to the configuration information of an object in operation 405 shown in FIG. 4 is described hereafter. In the following description, an electronic device may include the electronic device 101 shown in FIG. 1 or at least a portion (for example, the processor 120) of the electronic device 101.

Referring to FIG. 9, when an electronic device detects at least one object from an image displayed on a display (for example, operation 403 shown in FIG. 4), the electronic device can find the configuration information of the object (or a sub-object) detected from the image displayed on the display in operation 901. For example, the processor 120 can recognize an object (or a sub-object) checked through a server (an external device) as in operations 601 to 609 shown in FIG. 6 or operations 801 to 807 shown in FIG. 8. The processor 120 can detect the configuration information of an object (or a sub-object) including at least one of the kind, shape, and color of the object based on the recognition information of object (or the sub-object).

The electronic device can check whether there is a graphic variable corresponding to the configuration information of the object (or the sub-object) in operation 903. For example, the processor 120 can check whether there is a graphic variable corresponding to the configuration information of an object (for a sub-object) in a graphic variable list stored in the memory 130.

When there is a graphic variable corresponding to the configuration information of the object (or the sub-object), the electronic device can display detection information of the object (or the sub-object) based on the graphic information corresponding to the configuration information of the object (or the sub-object) in operation 905. For example, when the processor 120 detects a plurality of objects having different items of configuration information (for example, kinds) from an image displayed on the display 160, the processor 120 can control the display 160 to display different items of detection information on the objects based on the configuration information of the objects. For example, when the processor 120 extracts a plurality of sub-objects having different items of configuration information (for example, kinds) from one object, the processor 120 can control the display 160 to display different items of detection information on the sub-objects based on the configuration information of the sub-objects. For example, when one object (or a sub-object) has various properties, the processor 120 can control the display 160 to display various items of detection information on the object (or the sub-object) based on the various properties included in the object (or the sub-object).

When there is no graphic variable corresponding to the configuration information of an object (a sub-object), the electronic device can find a predetermined basic graphic variable in operation 907.

The electronic device can display detection information of the object (or the sub-object) based on the basic graphic variable in operation 909.

According to an embodiment, when there is graphic variables corresponding to the configuration information of at least some of sub-objects divided from an object, the electronic device can display detection information of the some of sub-objects based on graphic variables corresponding to the some of sub-objects. The electronic device can display detection information of the other sub-objects of the sub-objects divided from the object based on the basic graphic variable.

FIGS. 10A-10E illustrate a screen configuration displaying a graphic effect corresponding to the configuration information of an object in an electronic device according to various embodiments. In the following description, an embodiment for display detection information of an object or a sub-object based on operations 901 to 909 shown in FIG. 9 may be included.

Figure 10A:
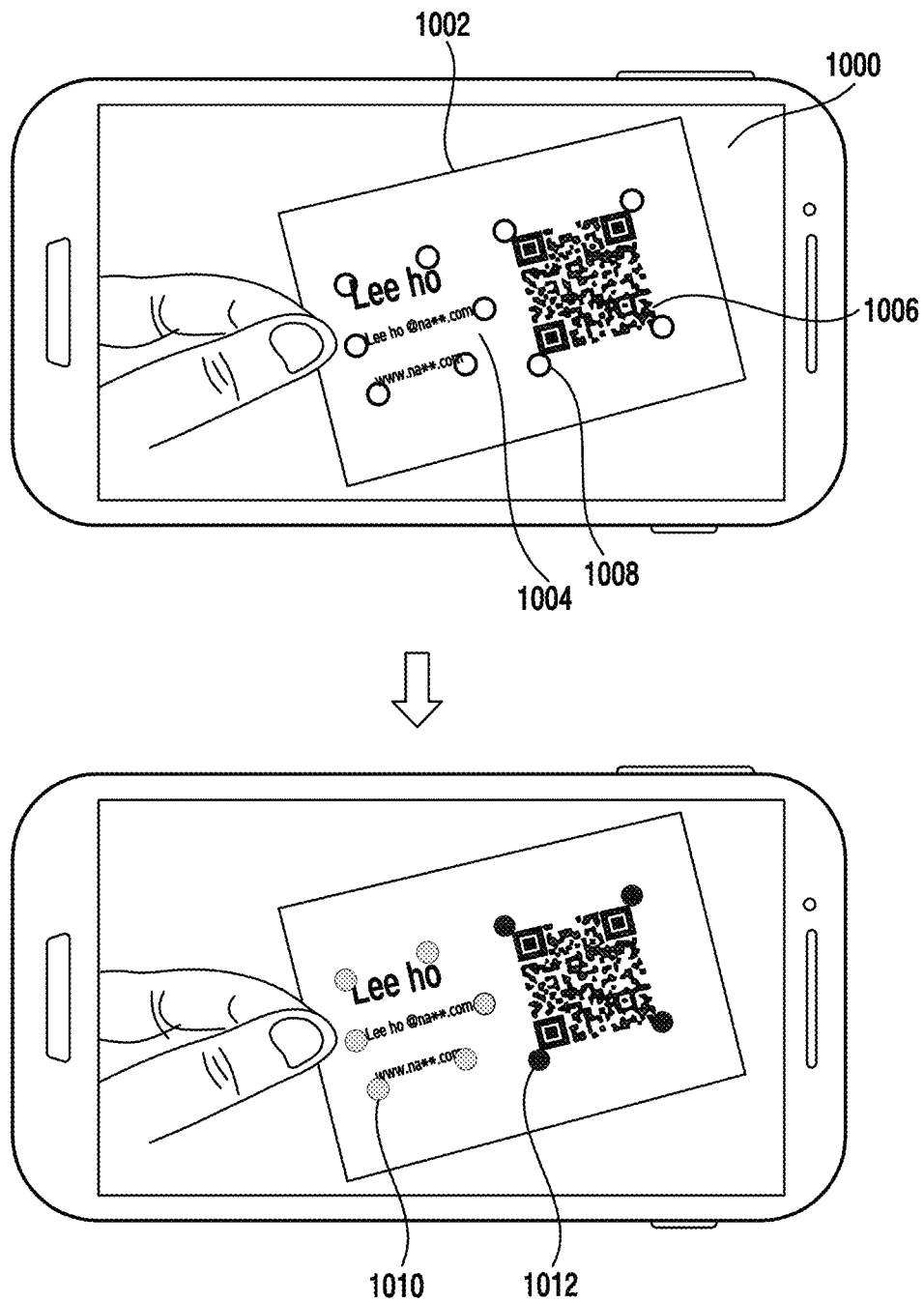
FIGS. 10A-10E illustrate a screen configuration displaying a graphic effect corresponding to the configuration information of an object in an electronic device according to various embodiments.

According to an embodiment, the processor 120, as shown in FIG. 10A, can control the display 160 to display an image 1000 (for example, a preview image) acquired through the camera 180. The processor 120 can detect a business card-shaped object 1002 by extracting characteristic points of the image 1000 displayed on the display 160. For example, the processor 120 can detect the object 1002 and sub-objects 1004 and 1006 included in the object 1002 based on the characteristic points of the image 1000 displayed on the display 160. For example, when the processor 120 determines that the shapes and kinds of the object 1002 and the sub-objects 1004 and 1006 are not clearly recognized, the processor 120 can control the display 160 to display detection information 1008 in the same type (for example, a transparent dot type) on the object 1002 and the sub-objects 1004 and 1006.

Figure 10B:
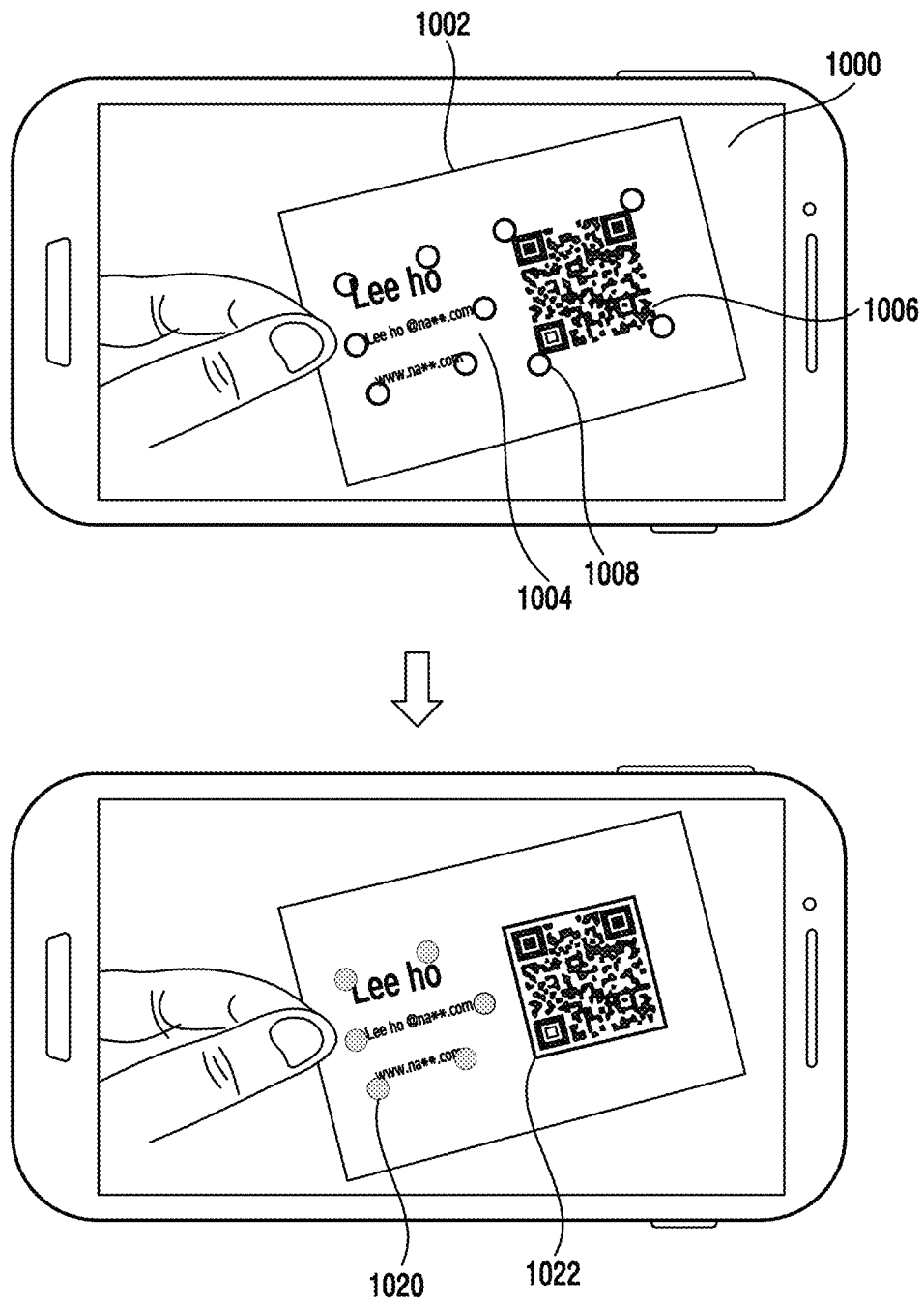

According to an embodiment, the processor 120 can recognize the sub-objects 1004 and 1006 divided from the object 1002 through a database stored in the electronic device 101 or through an external server. The processor 120 can control the display 160 to display different items of detection information 1010 and 1012 based on configuration information of the sub-objects 1004 and 1006 (for example, the kind of the object). Accordingly, the user of the electronic device 101 can discriminate the sub-objects 1004 and 1006 having different items of configuration information based on the items of detection information 1010 and 1012 displayed on the display 160. For example, the processor 120, as shown in FIG. 10A, can control the display 160 to display the detection information 1010 in a light dot type on the sub-object 1004 that is a text and the detection information 1012 in a dark dot type on the sub-object 1006 that is a QR code. That is, the sub-objects 1004 and 1006 can be discriminated by the difference in contrast of the items of detection information 1010 and 1012 displayed on the display 160. For example, the processor 120, as shown in FIG. 10B, can control the display 160 to display the detection information 1020 in a light dot type on the sub-object 1004 that is a text and detection information 1022 in a rectangular type including the sub-object 1006 on the sub-object 1006 that is a QR code. That is, the sub-objects 1004 and 1006 can be discriminated by the difference in shape of the items of detection information 1020 and 1022 displayed on the display 160. For example, the processor 120 can control the display 160 to make the items of detection information of sub-objects different based on accuracy in recognition depending on the kinds of sub-objects.

Figure 10C:
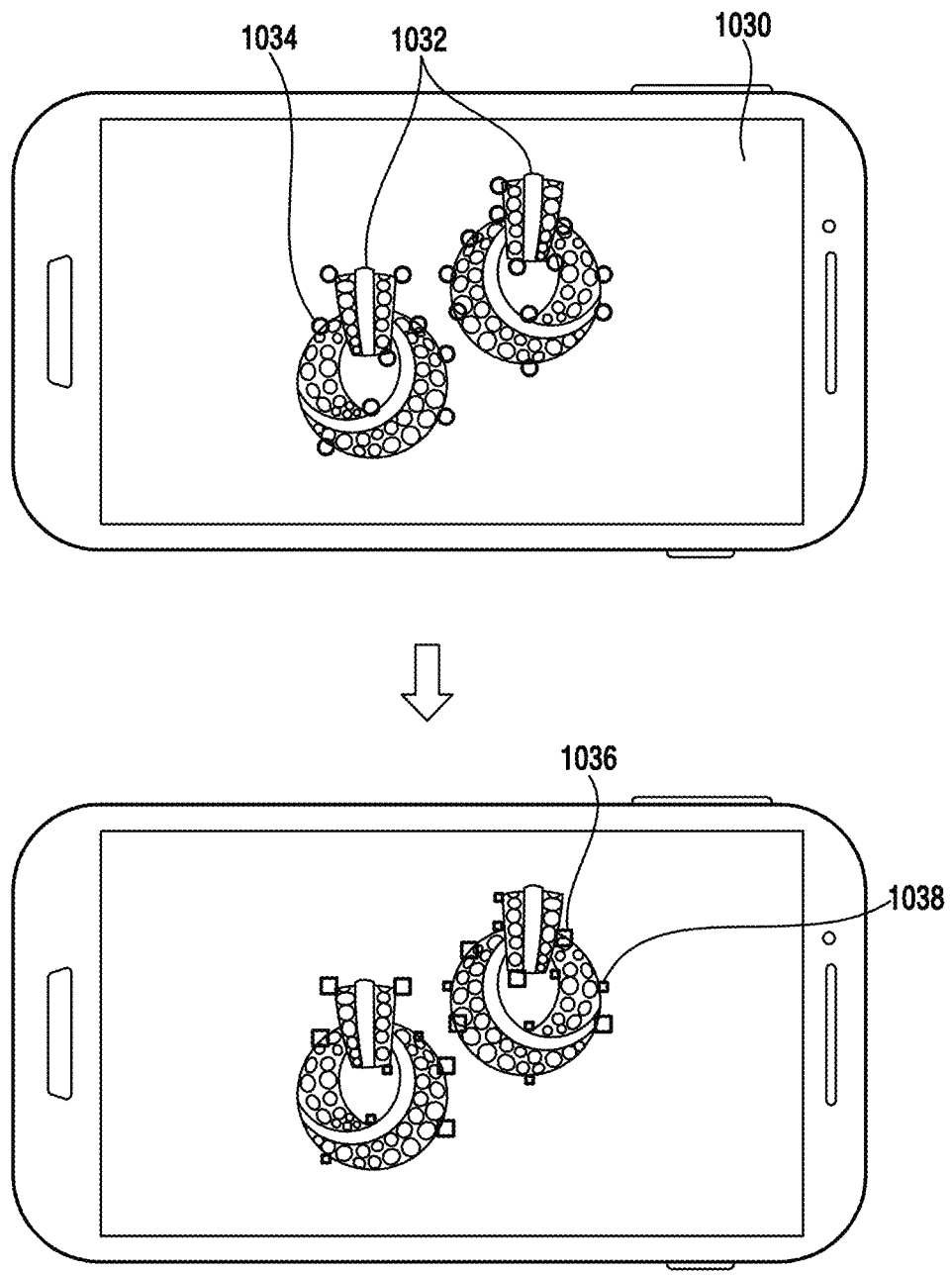

According to an embodiment, the processor 120, as shown in FIG. 10C, can detect an accessory-shaped object 1032 from an image 1030 acquired through the camera 180. For example, when the processor 120 cannot recognize the shape and the kind of the object 1032, the processor 120 can control the display 160 to display detection information 1034 in a transparent dot type on the object 1032.

According to an embodiment, when the processor 120 recognizes the kind and shape of the accessory-shaped object 1032, the processor 120 can determine a graphic variable corresponding to the configuration information (for example, the shape) of the object 1032. For example, the processor 120 can determine the size of detection information corresponding to the form of detection information and the curvature of an outline discriminated from the shape of the object 1032. For example, the form of detection information may be determined in a shape discriminated from the pattern included in the object 1032. For example, the processor 120, as shown in FIG. 10C, can control the display 160 to display items of detection information 1036 and 1038 in a rectangular type based on the graphic variable corresponding to the configuration information of the object 1032. In this case, the processor 120 can control the display 160 to differently display the sizes of the items of detection information 1036 and 1038 such that the items of detection information correspond to the curvature of the outline of the object 1032.

Figure 10D:
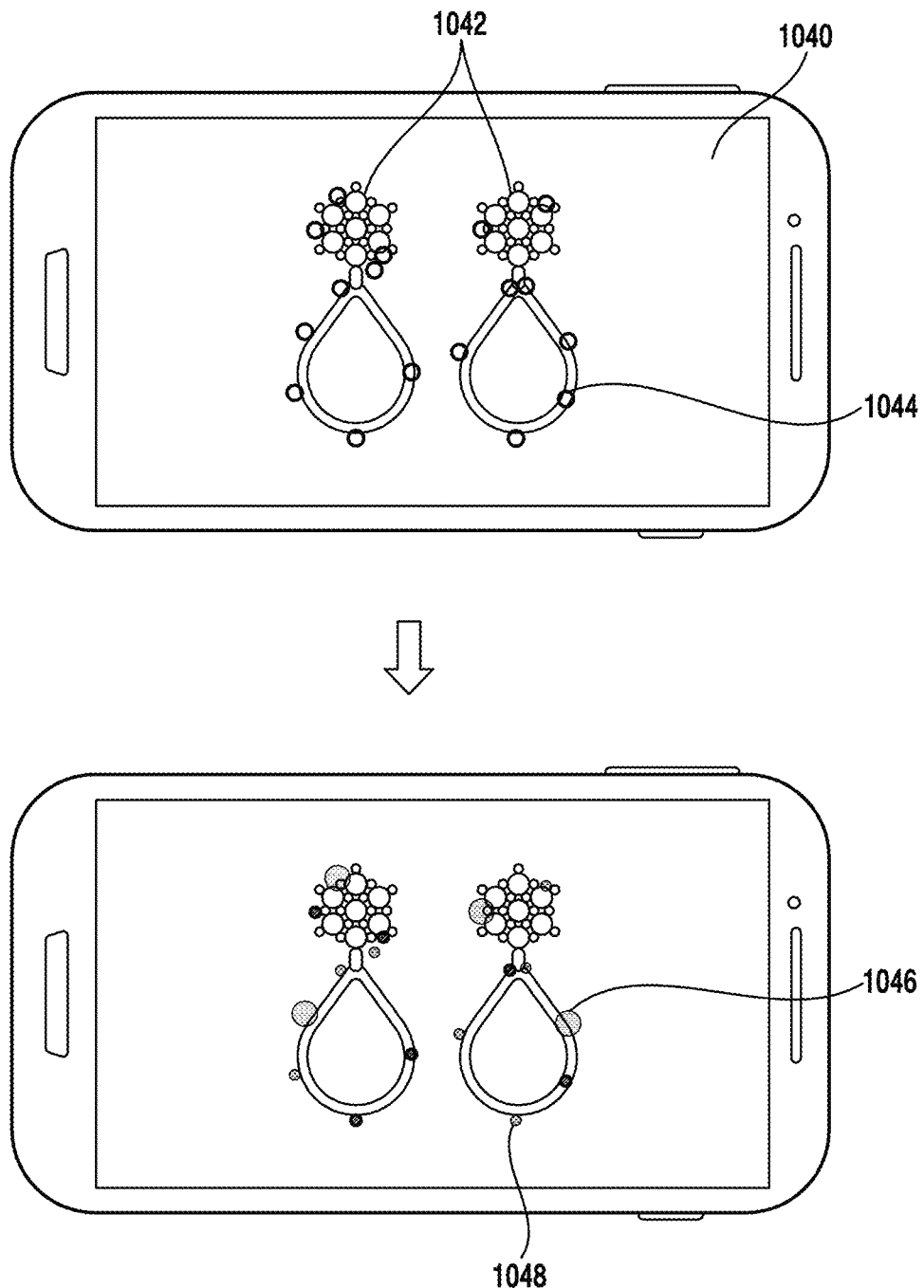

According to an embodiment, the processor 120, as shown in FIG. 10D, can detect an accessory-shaped object 1042 from an image 1040 acquired through the camera 180. For example, when the processor 120 determines a temporary shape and a temporary kind of the object 1042, the processor 120 can control the display 160 to display detection information 1044 in a transparent dot type on the object 1042.

According to an embodiment, when the processor 120 determines the kind and shape of the accessory-shaped object 1042, the processor 120 can determine a graphic variable corresponding to the configuration information (for example, the shape) of the object 1042. For example, the processor 120 can determine the size and color (or contrast) of detection information corresponding to the curvature of the outline of the object 1042. For example, the color of the detection information may be determined as a color (for example, a complementary color) discriminated from the color of the object 1042. The processor 120, as shown in FIG. 10D, can control the display 160 to display items of detection information 1046 and 1048 having various shapes and colors to correspond to the curvature of the outline based on the graphic variable corresponding to the configuration information of the object 1042.

Figure 10E:
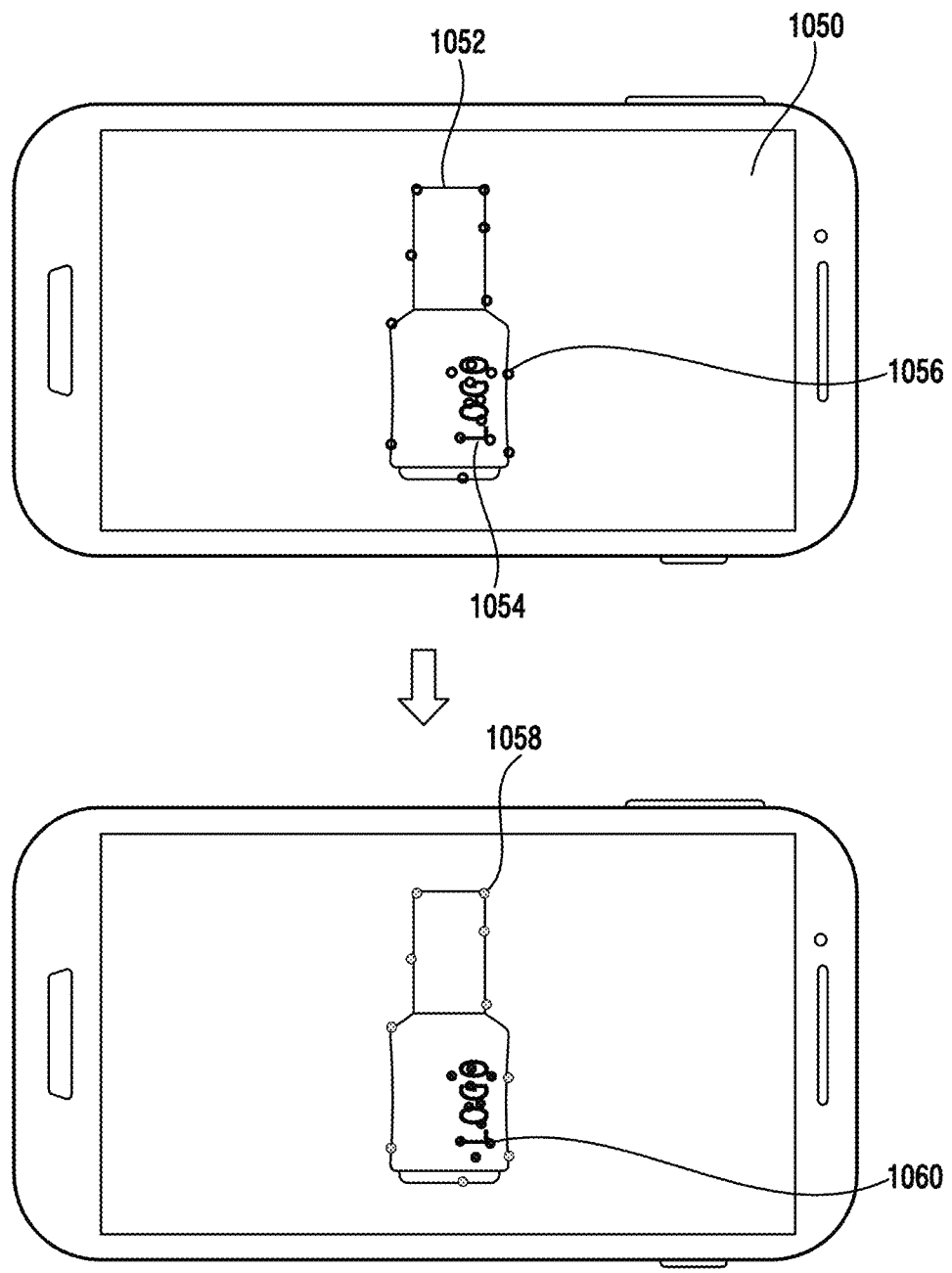

According to an embodiment, the processor 120, as shown in FIG. 10E, can detect a specific product-shaped object 1052 from an image 1050 acquired through the camera 180. For example, when the processor 120 cannot recognize the shape and the kind of the object 1052, the processor 120 can control the display 160 to display detection information 1056 in a transparent dot type on the object 1052. For example, when the processor 120 detects a sub-object 1054 (for example, a logo) of the object 1052, the processor 120 can control the display 160 to display detection information 1056 in the same type on the sub-object 1054.

According to an embodiment, when the processor 120 recognizes the kind and shape of the object 1052, the processor 120 can determine a graphic variable corresponding to the configuration information (for example, important area information) of the object 1052. For example, when the logo 1054 of the object 1052 is set as an important area, the processor 120, as shown in FIG. 10E, can control the display 160 to display detection information 1060 of the logo 1054 of the object 1052 differently from another detection information 1058. That is, the processor 120 can discriminate the important area 1054 and a non-important area 1058 from the difference in color of the items of detection information 1058 and 1060 displayed on the display 160.

Figure 11:
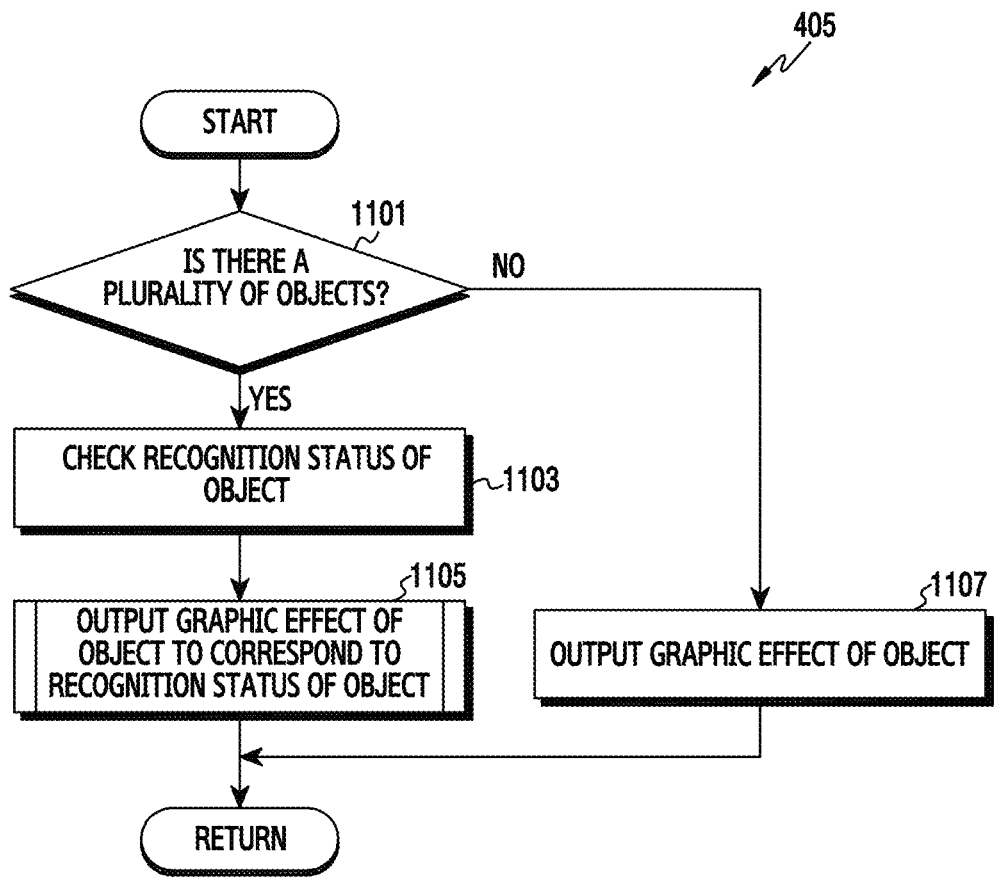
FIG. 11 illustrates a flowchart for outputting a graphic effect corresponding to the recognition status of an object in an electronic device according to various embodiments.
Figure 12A:
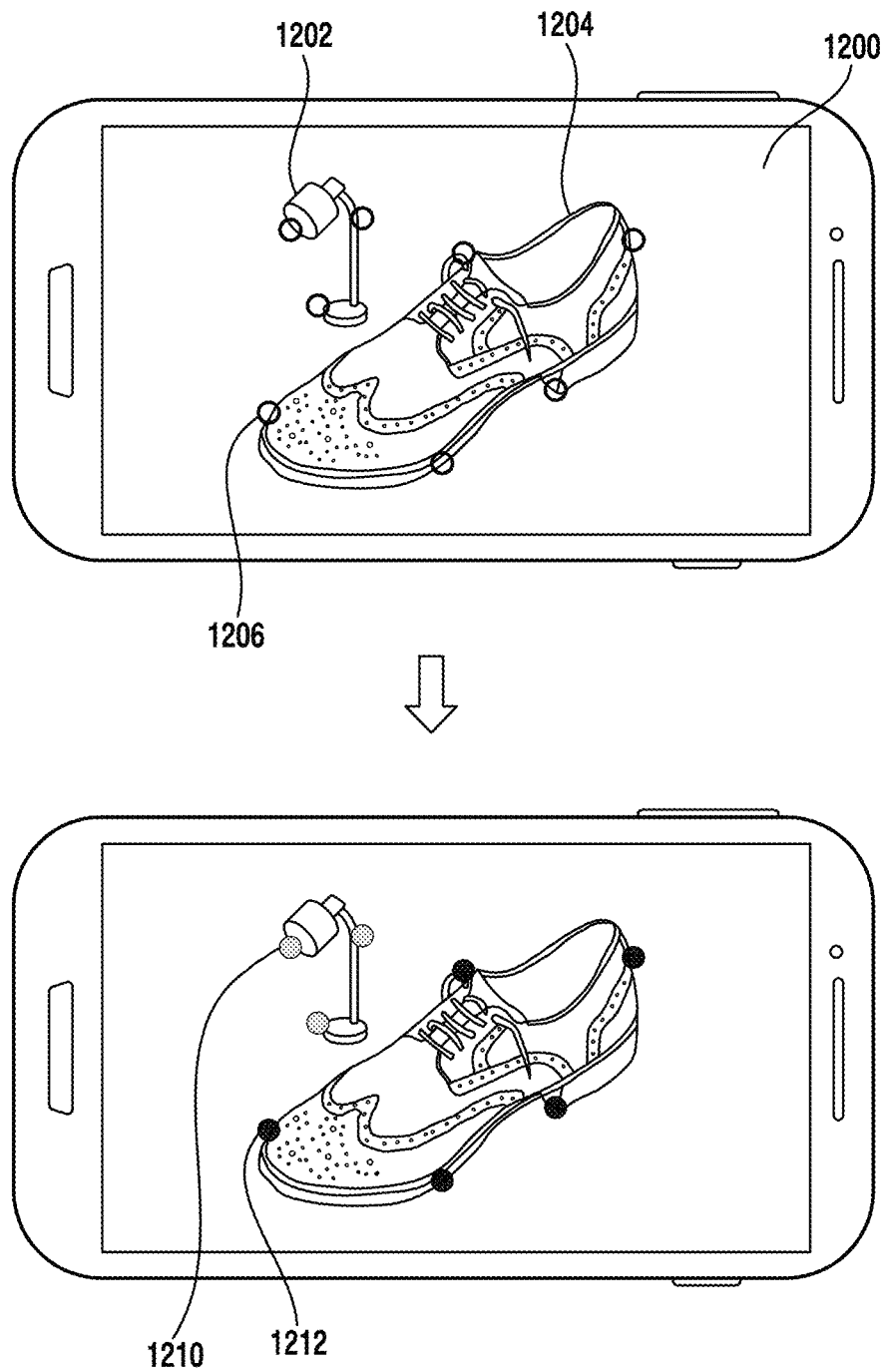
FIGS. 12A and 12B illustrate a screen configuration displaying a graphic effect corresponding to the recognition status of an object in an electronic device according to various embodiments.
Figure 12B:
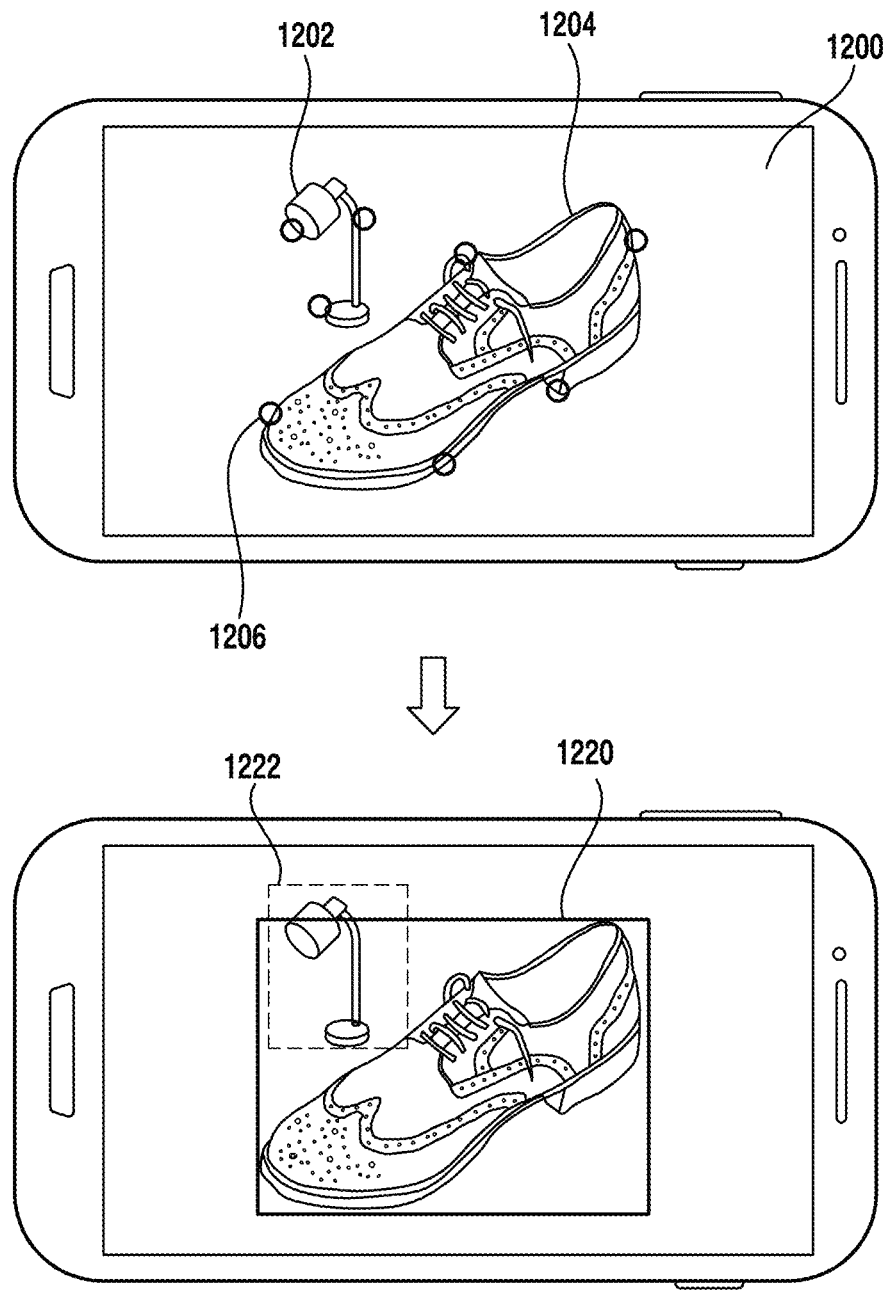

FIG. 11 illustrates a flowchart for outputting a graphic effect corresponding to the recognition status of an object in an electronic device according to various embodiments. FIGS. 12A and 12B illustrate a screen configuration displaying a graphic effect corresponding to the recognition status of an object in an electronic device according to various embodiments. An operation for outputting a graphic effect corresponding to the configuration information of an object in operation 405 shown in FIG. 4 is described hereafter. In the following description, an electronic device may include the electronic device 101 shown in FIG. 1 or at least a portion (for example, the processor 120) of the electronic device 101.

Referring to FIG. 11, when an electronic device detects at least one object from an image displayed on a display (for example, operation 403 shown in FIG. 4), the electronic device checks whether a plurality of objects is detected from the image displayed on the display in operation 1101. For example, the processor 120, as shown in FIG. 12A, can check whether a plurality of objects such as a first object 1202 and a second object 1204 is detected from an image 1200 displayed on the display 160.

When the electronic device detects one object from an image displayed on a display, the electronic device can output a graphic effect displaying detection information of the object based on a graphic variable corresponding to the configuration information of the object in operation 1107. For example, the configuration information of an object may include at least one of the kind, shape, and color of an object.

When the electronic device detects a plurality of objects from an image displayed on a display, the electronic device can check the recognition statuses of the objects in operation 1103. For example, the recognition status of an object may include at least one of a recognition standby status, a recognition progression status, and a recognition completion status.

The electronic device can output graphic effects of objects to correspond to the recognition statuses of objects in operation 1105. For example, the processor 120, as shown in FIG. 12A, can display detection information 1212 in a dark dot type on the second object 1204 that is in the recognition progression status. In this case, the processor 120 can control the display 160 to display detection information 1210 in a light dot type so that the first object 1202 that is in the recognition standby status is discriminated from the second object 1204. For example, the processor 120, as shown in FIG. 12B, can display detection information 1220 in a solid line type on the second object 1204 that is in the recognition progression status. In this case, the processor 120 can control the display 160 to display detection information 1222 in a dotted line type so that the first object 1202 that is in the recognition standby status is discriminated from the second object 1204.

According to an embodiment, when the electronic device does not recognize the kinds and shapes of a plurality of objects 1202 and 1204 detected from the image 1200 displayed on a display, as shown in FIGS. 12A and 12B, the electronic device can display detection information 1206 in the same type (for example, a transparent dot type) on the objects 1202 and 1204.

Figure 13:
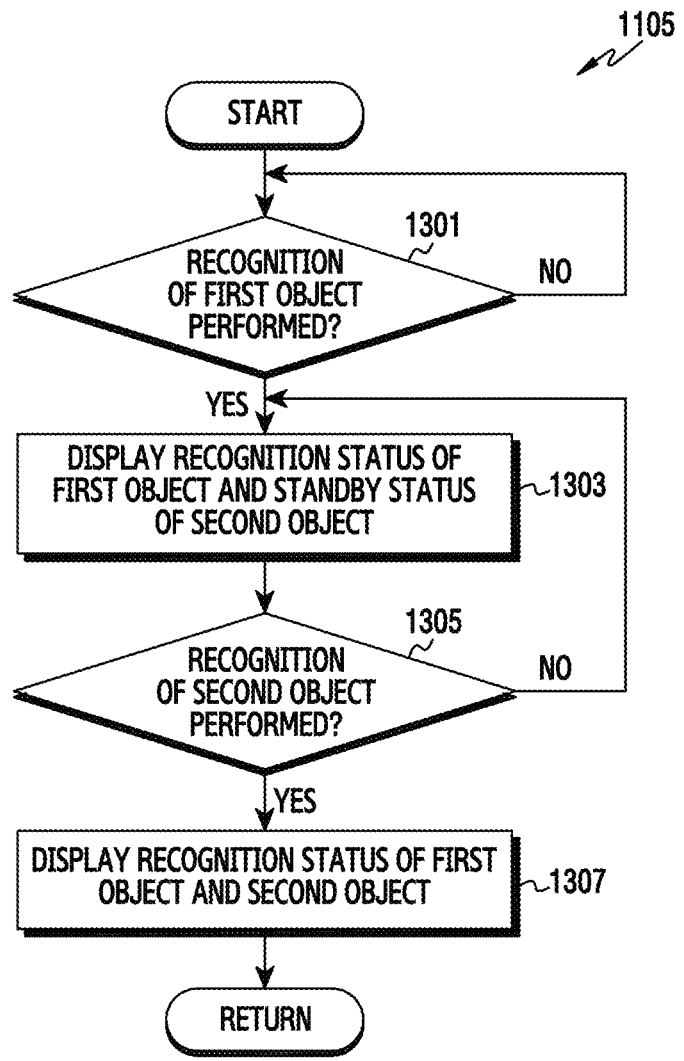
FIG. 13 illustrates a flowchart for displaying a graphic effect corresponding to the recognition status of an object in an electronic device according to various embodiments.

FIG. 13 illustrates a flowchart for displaying a graphic effect corresponding to the recognition status of an object in an electronic device according to various embodiments. An operation for outputting a graphic effect corresponding to the recognition status of an object in operation 1105 shown in FIG. 11 is described hereafter. In the following description, an electronic device may include the electronic device 101 shown in FIG. 1 or at least a portion (for example, the processor 120) of the electronic device 101.

Referring to FIG. 13, when an electronic device finds the recognition statuses of a plurality of objects detected from an image (for example, operation 1103 shown in FIG. 11), the electronic device can check whether a first object of the objects is recognized in operation 1301. For example, when the processor 120 can detect a plurality of objects from an image displayed on the display 160, the processor 120 can individually recognize the objects. Accordingly, the processor 120 can check whether an operation of recognizing the first object is performed with the other objects of the objects in the recognition standby status. For example, the operation of recognizing the first object may include a series of operations of transmitting information of the first object to a first server corresponding to the first object and receiving detailed information of the first object from the first server.

When the electronic device recognizes the first object of the objects, the electronic device can display items of detection information corresponding to the recognition status of the first object and the standby status of the second object in operation 1303. For example, the processor 120, as shown in FIG. 12A, can control the display 160 to display detection information 1212 of the object that is in the recognition progression status in a dark dot type and detection information 1210 of the object that is in the recognition standby status in a light dot type.

The electronic device can check whether the second object of the objects is recognized in operation 1305. For example, the processor 120 can check whether information of the second object of the objects has been transmitted to a second server corresponding to the second object.

When the second object is in the recognition standby status, the electronic device can display items of detection information corresponding to the recognition status of the first object and the standby status of the second object in operation 1303. For example, when the processor 120 completes detection of the first object, the electronic device can control the display 160 to display detection information corresponding to the recognition completion status of the first object. In this case, the processor 120 can control the display 160 to display detection information corresponding to the recognition standby status of the second object.

When the electronic device recognizes the second object, the electronic device can display items of detection information corresponding to the recognition statuses of the first object and the second object in operation 1307. For example, when the processor 120 recognizes the first object and the second object, the processor 120 can control the display 160 to display detection information in the same type on the first object and the second object.

According to an embodiment, when the electronic device finishes recognizing the first object and the second object detected from the image displayed on the display, the electronic device can output graphic effects corresponding to the configuration information of the objects. For example, when the items of configuration information (for example, kinds) of the first object 1202 and the second object 1204 are different, the processor 120, as shown in FIG. 12B, can control the display 160 to display the detection information 1222 of the first object 1202 in a dotted line type and the detection information 1220 of the second object 1204 in a solid line type.

According to various embodiments, a method of operating an electronic device may include an operation of displaying an image on a display electrically connected with the electronic device, an operation of detecting at least one object from the image, and an operation of displaying detection information corresponding to the object based on the configuration information of the object.

According to various embodiments, the configuration information of an object may include at least one of the kind, shape, and color of an object.

According to various embodiments, the operation of displaying detection information may include an operation of dividing a plurality of sub-objects from an object detected from an image, an operation of determining graphic variables corresponding to the configuration information of the sub-objects, and an operation of displaying detection information corresponding to the sub-objects based on the graphic variables corresponding to the configuration information of the sub-objects.

According to various embodiments, the graphic variable may include at least one of the form, color, contrast, definition, and size of detection information.

According to various embodiments, the operation of displaying detection information may include an operation of displaying detection information corresponding to the object close to the outline of the object.

According to various embodiments, the operation of displaying detection information may include an operation of detecting at least one graphic variable corresponding to the outline based on the curvature of the outline of the object and an operation of displaying detection information showing a change in curvature of the outline of the object based on the graphic variable corresponding to the outline.

According to various embodiments, the operation of detecting an object may include an operation of dividing a plurality of sub-objects from an object detected from the image, an operation of transmitting at least one of the sub-objects to at least one server corresponding to the sub-object, an operation of receiving detailed information of the sub-objects, and an operation of recognizing the object detected from the image based on the detailed information of the sub-objects when the items of detailed information of the sub-object correspond to each other.

According to various embodiments, the operation of detecting an object may include an operation of dividing a plurality of sub-objects from an object detected from the image, an operation of selecting important sub-objects from the sub-objects, an operation of transmitting the important sub-objects to a server, an operation of receiving detailed information of the important sub-objects, and an operation of recognizing the object detected from the image based on the detailed information of the important sub-objects.

According to various embodiments, an operation of detecting graphic variables corresponding to the recognition statuses of objects and an operation of displaying detection information corresponding to the objects based on the graphic variables corresponding to the recognition statuses of the objects when a plurality of objects is detected from the image may be further included.

According to various embodiments, the operation of displaying the image may include an operation of displaying an image acquired through a camera electrically connected with the electronic device.

The electronic device and the method of operating the electronic device according to various embodiments can increase the recognition rate on an object included in an image by acquiring information of an object displayed on a display by transmitting at least a portion of the object to at least one server.

The electronic device and the method of operating the electronic device according to various embodiments can enable a user of the electronic device to easily recognize an object detected by the electronic device by displaying the configuration information of an object and a graphic effect corresponding to a recognition status when an object displayed on a display is recognized.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a display;
    at least one processor;
    a communication interface coupled to the at least one processor; and
    a memory coupled to the at least one processor, stores instructions executable by the at least one processor to:
        control the display to display an image;
        detect at least one object from the image;
        divide a plurality of sub-objects from the at least one object detected from the image;
        control the communication interface to transmit information of the plurality of sub-objects to servers corresponding to the sub-objects;
        receive detailed information of the plurality of sub-objects from the servers through the communication interface;
        recognize the at least one object detected from the image based on the detailed information of the plurality of sub-objects when the detailed information of the plurality of sub-objects correspond to each other;
        control the display to display detection information of the at least one object detected from the image close to the at least one object, using at least one graphic variable corresponding to configuration information of the at least one object,
        detect the at least one graphic variable corresponding to an outline of the at least one object based on a curvature of the outline of the at least one object; and
        control the display to display the detection information showing a change in the curvature of the outline of the at least one object using the at least one graphic variable corresponding to the outline.

2. The electronic device of claim 1, wherein the configuration information of the at least one object includes at least one of a kind, a shape, or a color of the at least one object.

3. The electronic device of claim 1, wherein the instructions are further executable by the at least one processor to:
    determine graphic variables corresponding to configuration information of the plurality of sub-objects; and
    control the display to display detection information of the plurality of sub-objects using the graphic variables corresponding to the configuration information of the plurality of sub-objects.

4. The electronic device of claim 3, wherein the graphic variables include at least one of a form, a color, a contrast, a definition, or a size of detection information.

5. The electronic device of claim 1, wherein the display is further configured to display the detection information of the at least one object close to the outline of the at least one object.

6. The electronic device of claim 1, wherein the instructions are further executable by the at least one processor to:
    select important sub-objects from the plurality of sub-objects;
    control the communication interface to transmit the important sub-objects to a server;
    receive detailed information of the important sub-objects from the server through the communication interface; and
    recognize the at least one object detected from the image based on the detailed information of the important sub-objects.

7. The electronic device of claim 1, wherein the instructions are further executable by the at least one processor to:
    recognize objects when detecting a plurality of objects from the image;
    detect graphic variables corresponding to recognition statuses of the objects; and
    control the display to display detection information of the objects using the graphic variables corresponding to the recognition statuses of the objects.

8. The electronic device of claim 1, further comprising a camera, wherein the image includes an image acquired through the camera.

9. A method of operating an electronic device, the method comprising:

displaying an image on a display electrically connected with the electronic device;

detecting at least one object from the image;

dividing a plurality of sub-objects from the at least one object detected from the image;

transmitting information of the plurality of sub-objects to servers corresponding to the sub-objects;

receiving detailed information of the plurality of sub-objects from the servers;

recognizing the at least one object detected from the image based on the detailed information of the plurality of sub-objects when the detailed information of the plurality of sub-objects correspond to each other; and displaying detection information of the at least one object detected from the image close to the at least one object, using at least one graphic variable corresponding to configuration information of the at least one object, wherein displaying the detection information includes:
  detecting the at least one graphic variable corresponding to an outline of the at least one object based on a curvature of the outline of the at least one object; and
  displaying the detection information showing a change in the curvature of the outline of the at least one object using the at least one graphic variable corresponding to the outline.

10. The method of claim 9, wherein the configuration information of the at least one object includes at least one of a kind, a shape, or a color of the at least one object.

11. The method of claim 9, wherein displaying the detection information includes:
  determining graphic variables corresponding to configuration information of the plurality of sub-objects; and
  displaying detection information of the plurality of sub-objects using the graphic variables corresponding to the configuration information of the plurality of sub-objects.

12. The method of claim 11, wherein the graphic variables include at least one of a form, a color, a contrast, a definition, or a size of detection information.

13. The method of claim 9, wherein displaying the detection information includes:
  displaying the detection information of the at least one object close to the outline of the object.

14. The method of claim 9, wherein detecting the at least one object includes:
  selecting important sub-objects from the plurality of sub-objects;
  transmitting the important sub-objects to a server;
  receiving detailed information of the important sub-objects from the server; and
  recognizing the at least one object detected from the image based on the detailed information of the important sub-objects.

15. The method of claim 9, further comprising:
  detecting graphic variables corresponding to recognition statuses of objects when a plurality of objects is detected from the image; and
  displaying detection information of the plurality of objects using the graphic variables corresponding to the recognition statuses of the objects.

16. The method of claim 9, wherein displaying the image includes:
  displaying an image acquired through a camera electrically connected with the electronic device.

* * * * *